US012812251B2

(12) United States Patent
Park

(10) Patent No.: US 12,812,251 B2
(45) Date of Patent: Nov. 24, 2026

(54) CAMERA DEVICE WITH OIS FUNCTION BY MOVING AN IMAGE SENSOR AND OPTICAL INSTRUMENT

(71) Applicant: LG INNOTEK CO., LTD., Seoul (KR)

(72) Inventor: Jae Keun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/902,174

(22) Filed: Sep. 30, 2024

(65) Prior Publication Data

US 2025/0024150 A1 Jan. 16, 2025

Related U.S. Application Data

(63) Continuation of application No. 18/198,616, filed on May 17, 2023, now Pat. No. 12,132,991, which is a (Continued)

(30) Foreign Application Priority Data

Jun. 29, 2018 (KR) ........................ 10-2018-0075773
Jun. 29, 2018 (KR) ........................ 10-2018-0075774

(51) Int. Cl.
*H04N 23/68* (2023.01)
*G02B 7/09* (2021.01)

(Continued)

(52) U.S. Cl.
CPC ............ *H04N 23/687* (2023.01); *G02B 7/09* (2013.01); *G02B 27/646* (2013.01); *G03B 5/00* (2013.01);

(Continued)

(58) Field of Classification Search
None
See application file for complete search history.

(56) References Cited

U.S. PATENT DOCUMENTS

2006/0018643 A1* 1/2006 Stavely ................ H04N 23/687 348/E5.046
2006/0146400 A1 7/2006 Seo (Continued)

FOREIGN PATENT DOCUMENTS

CN 1862358 A 11/2006
CN 101334573 A 12/2008

(Continued)

*Primary Examiner* — Paul M Berardesca

(74) *Attorney, Agent, or Firm* — Birch, Stewart, Kolasch & Birch, LLP

(57) ABSTRACT

A camera device including a mover including a first magnet; a lens; a stator including a first coil; a first substrate; a second substrate movably disposed on the first substrate; an image sensor disposed on the second substrate; a second coil disposed on the first substrate; and a second magnet disposed on the second substrate and facing the second coil is provided. The second substrate includes a coupling part coupled to the image sensor, and an extension part extending outwardly from the coupling part so that at least a portion thereof overlaps with the first substrate in the optical axis direction, and the camera device further includes a ball disposed between the first substrate and the extension part of the second substrate.

20 Claims, 16 Drawing Sheets

Related U.S. Application Data continuation of application No. 17/739,381, filed on May 9, 2022, now Pat. No. 11,696,032, which is a continuation of application No. 17/252,070, filed as application No. PCT/KR2019/007813 on Jun. 27, 2019, now Pat. No. 11,356,610.

(51) Int. Cl.

| | |
|---|---|
| ***G02B 27/64*** | (2006.01) |
| ***G03B 5/00*** | (2021.01) |
| ***G03B 13/36*** | (2021.01) |
| ***H04N 23/54*** | (2023.01) |
| ***H04N 23/55*** | (2023.01) |
| ***H04N 23/57*** | (2023.01) |
| *H04N 23/53* | (2023.01) |

(52) U.S. Cl.

CPC ............. *G03B 13/36* (2013.01); *H04N 23/54* (2023.01); *H04N 23/55* (2023.01); *H04N 23/57* (2023.01); *G03B 2205/0007* (2013.01); *H04N 23/53* (2023.01)

(56) References Cited

U.S. PATENT DOCUMENTS

| | | | | |
|---|---|---|---|---|
| 2007/0202307 | A1 | 8/2007 | Oh et al. | |
| 2008/0049109 | A1* | 2/2008 | Teramoto ........... | H04N 23/6812 348/E5.025 |
| 2008/0198249 | A1 | 8/2008 | Tanimura et al. | |
| 2009/0179992 | A1 | 7/2009 | Jeong et al. | |
| 2011/0050921 | A1 | 3/2011 | Noto | |
| 2011/0097061 | A1* | 4/2011 | Lee ........................ | H04N 23/54 396/55 |
| 2012/0182472 | A1 | 7/2012 | Inata et al. | |
| 2013/0270419 | A1 | 10/2013 | Singh et al. | |
| 2016/0154249 | A1 | 6/2016 | Yeo | |
| 2016/0161757 | A1 | 6/2016 | Hee et al. | |
| 2017/0085799 | A1 | 3/2017 | Yoshida | |
| 2017/0272658 | A1* | 9/2017 | Ito .......................... | H04N 23/55 |
| 2017/0289457 | A1 | 10/2017 | Hu et al. | |
| 2017/0324905 | A1 | 11/2017 | Yu | |
| 2018/0110124 | A1 | 4/2018 | Shigemitsu et al. | |
| 2018/0203203 | A1* | 7/2018 | Lee ....................... | H04N 23/687 |
| 2019/0141248 | A1* | 5/2019 | Hubert ............... | H02K 41/0356 |
| 2020/0280665 | A1 | 9/2020 | Sasaki et al. | |
| 2020/0374462 | A1 | 11/2020 | Noguchi et al. | |
| 2021/0149210 | A1 | 5/2021 | Fukushima et al. | |
| 2021/0208417 | A1 | 7/2021 | Choi et al. | |
| 2022/0191359 | A1 | 6/2022 | Oh | |

FOREIGN PATENT DOCUMENTS

| | | | | |
|---|---|---|---|---|
| CN | 101533141 | A | 9/2009 | |
| CN | 103443702 | A | 12/2013 | |
| CN | 105446053 | A | 3/2016 | |
| CN | 105573014 | A | 5/2016 | |
| CN | 107295225 | A | 10/2017 | |
| CN | 107850751 | A | 3/2018 | |
| CN | 109076154 | A | 12/2018 | |
| JP | 2006-31026 | A | 2/2006 | |
| JP | 2007-135198 | A | 5/2007 | |
| JP | 2007-305806 | A | 11/2007 | |
| JP | 2008-278382 | A | 11/2008 | |
| JP | 2010-286567 | A | 12/2010 | |
| JP | 2011-53241 | A | 3/2011 | |
| JP | 2013-44924 | A | 3/2013 | |
| JP | 2013-50668 | A | 3/2013 | |
| JP | 2013-205549 | A | 10/2013 | |
| JP | 5639161 | B2 | 12/2014 | |
| KR | 10-0742978 | B1 | 7/2007 | |
| KR | 10-0790681 | B1 | 1/2008 | |
| KR | 10-2008-0017897 | A | 2/2008 | |
| KR | 10-2012-0066264 | A | 6/2012 | |
| KR | 10-2012-0133905 | A | 12/2012 | |
| KR | 10-2013-0096810 | A | 9/2013 | |
| KR | 10-1415038 | B1 | 7/2014 | |
| KR | 10-2017-0049094 | A | 5/2017 | |
| KR | 10-2017-0067329 | A | 6/2017 | |
| KR | 10-2018-0014527 | A | 2/2018 | |
| KR | 10-2018-0033959 | A | 4/2018 | |
| KR | 10-2018-0037691 | A | 4/2018 | |
| KR | 10-2018-0047724 | A | 5/2018 | |
| WO | WO 2016/143179 | A1 | 9/2016 | |
| WO | WO-2017010745 | A1 * | 1/2017 | ......... H02K 41/0356 |
| WO | WO 2017/156462 | A1 | 9/2017 | |

* cited by examiner

CAMERA DEVICE WITH OIS FUNCTION BY MOVING AN IMAGE SENSOR AND OPTICAL INSTRUMENT

CROSS REFERENCE TO RELATED APPLICATIONS

This application is a Continuation of application Ser. No. 18/198,616, filed on May 17, 2023, which is a Continuation of application Ser. No. 17/739,381, filed on May 9, 2022 (now U.S. Pat. No. 11,696,032, issued on Jul. 4, 2023), which is a Continuation of application Ser. No. 17/252,070, filed on Dec. 14, 2020 (now U.S. Pat. No. 11,356,610, issued on Jun. 7, 2022), which is the National Phase of PCT International Application No. PCT/KR2019/007813, filed on Jun. 27, 2019, which claims priority under 35 U.S.C. 119 (a) to Patent Applications Nos. 10-2018-0075773 and 10-2018-0075774, filed in the Republic of Korea on Jun. 29, 2018, all of which are hereby expressly incorporated by reference into the present application.

TECHNICAL FIELD

The present exemplary embodiment relates to a camera device and an optical instrument

BACKGROUND ART

The following description provides background information for the present exemplary embodiment and does not describe the prior art.

As various portable terminals are widely spread and commonly used, and wireless Internet services has been commercialized, the demands of consumer related to portable terminals have been diversified and various kinds of additional devices have been installed in portable terminals.

Among them, there is a camera apparatus for photographing a subject as a photograph or a moving picture. Meanwhile, in recent camera devices, an autofocus function that automatically adjusts focus according to the distance of a subject is applied. In addition, an image stabilization function that prevents an image from shaking caused by the hand shaking of a photographer has been applied.

Meanwhile, a method through lens shifting has been developed as a method of performing the image stabilization function, however, in the case of the lens shifting model, there is a problem that the length in the x-axis/y-axis direction of the camera device increases as much as the stroke length of the lens.

DETAILED DESCRIPTION OF THE INVENTION

Technical Subject

The present embodiment is to provide a camera device that performs an image stabilization function through an image sensor shifting.

Furthermore, it is intended to provide a camera device that performs a more precise image stabilization function by synchronizing the image sensor shifting and the lens shifting.

In addition, it is intended to provide an optical instrument comprising the camera device.

Technical Solution

A camera device according to the present embodiment comprises: a mover comprising a first magnet; a lens; a stator comprising a first coil; a first substrate; a second substrate movably disposed on the first substrate; an image sensor disposed on the second substrate; a second coil disposed on the first substrate; and a second magnet disposed on the second substrate and facing the second coil, wherein the second substrate comprises: a coupling part coupled to the image sensor, and an extension part extending outwardly from the coupling part so that at least a portion thereof overlaps with the first substrate in the optical axis direction, and the camera device may further comprise a ball disposed between the first substrate and the extension part of the second substrate.

The second substrate is a rigid substrate and a flexible third substrate electrically connecting the first substrate and the second substrate may be comprised.

The first substrate comprises a groove formed on an upper surface of the first substrate, and the ball may be disposed in the groove of the first substrate.

The first substrate comprises a hole, the image sensor is disposed in the hole of the first substrate, the second coil overlaps the ball in an optical axis direction, and the second magnet may be disposed on an upper surface of the second substrate and overlapped with the second coil in the optical axis direction.

The ball may be disposed between the groove of the first substrate and the extension part of the second substrate.

The extension part of the second substrate comprises a first extension part disposed in a first axis direction with respect to the image sensor, and a second extension part disposed in a second axis direction perpendicular to the first axis with respect to the image sensor, wherein the third substrate may be disposed between the first axis and the second axis.

The third substrate may be disposed at a corner side of the image sensor.

The mover further comprises a housing, a bobbin disposed in the housing; a third coil disposed on the bobbin, and an elastic member connecting the housing and the bobbin, wherein the first magnet is disposed in the housing and faces the third coil, and wherein the camera device may further comprise a support member connecting the mover and the stator.

An optical instrument according to the present embodiment comprises: a main body; the camera device of claim 1 disposed on the main body; and a display disposed on the main body and outputting an image photographed by the camera device.

The camera device according to the present embodiment may comprise: a housing; a bobbin disposed inside the housing; a lens coupled to the bobbin; a base disposed under the housing; a first coil disposed on the bobbin; a first magnet disposed in the housing and facing the first coil; a second coil disposed on the base and facing the first magnet; a first substrate disposed under the base; a second substrate at least partially being overlapped with the first substrate in an optical axis direction; a ball disposed between the first substrate and the second substrate; an image sensor disposed on the second substrate; a third coil disposed on the first substrate; a second magnet disposed on the image sensor and facing the third coil; and a flexible third substrate electrically connecting the first substrate and the second substrate.

A camera device according to the present embodiment may comprise: a mover coupled to a lens; a stator disposed to be spaced apart from the mover; a first substrate disposed on one side of the stator; a second substrate movably disposed on the first substrate; an image sensor disposed on the second substrate; a second coil disposed on the first substrate; and a second magnet disposed on the second substrate and facing the second coil.

The stator comprises a housing and a first magnet disposed in the housing. The mover may comprise a bobbin disposed in the housing and a first coil disposed on the bobbin and facing the first magnet.

The mover may comprise a housing, a bobbin disposed in the housing, a first coil disposed on the bobbin, and a first magnet disposed in the housing and facing the first coil. The stator may comprise a base disposed under the housing and a third coil disposed on the base and facing the first magnet.

The camera device according to the present embodiment comprises: a mover comprising a first magnet; a lens coupled to the mover; a stator comprising a first coil facing the first magnet and disposed on one side of the mover; a first substrate disposed on one side of the stator; a second substrate movably disposed on the first substrate; an image sensor disposed on the second substrate and comprising a first side; a second coil disposed on the first substrate; and a second magnet disposed on the image sensor and facing the second coil, wherein the first substrate comprises a first portion corresponding to the first side of the image sensor, and wherein the second substrate may comprise a plurality of flexible connecting portions coupled to the first portion of the first substrate.

The second substrate may comprise a 2-1 substrate connecting the first substrate and the image sensor in a first axis direction, and a 2-2 substrate connecting the first substrate and the image sensor in a second axis direction perpendicular to the first axis.

The second substrate comprises an inner side portion coupled to the image sensor and an outer side portion coupled to the first substrate, and the plurality of flexible connecting portions may connect the inner side portion and the outer side portion.

The first substrate comprises a hole, the image sensor is disposed in the hole of the first substrate, the second coil is disposed on an inner side surface of the hole of the first substrate, and the second magnet may be disposed on the outer side surface of the image sensor.

The second substrate may be coupled to one surface of the image sensor and to one surface of the first substrate, and a third substrate comprising a connecting portion connected to the outside may be coupled to the other surface of the first substrate.

The camera device may further comprise a reinforcing plate coupled to the third substrate.

The mover comprises a housing, a bobbin disposed in the housing, a third coil disposed on the bobbin, and an elastic member connecting the housing and the bobbin, wherein the first magnet is disposed in the housing and faces the third coil, and the camera device may further comprises a support member connecting the mover and the stator.

The image sensor is connected to the second substrate by a flip chip, the second magnet is fixed to the second substrate by an adhesive, and the second coil is formed as a pattern coil on the first substrate.

An optical instrument according to the present embodiment comprises a main body, a camera device disposed on the main body, and a display disposed on the main body and outputting an image photographed by the camera device.

A camera device according to the present embodiment may comprise: a housing; a bobbin disposed in the housing; a lens coupled to the bobbin; a base disposed under the housing; a first coil disposed on the bobbin; a first magnet disposed in the housing and facing the first coil; a second coil disposed on the base and facing the first magnet; a first substrate disposed under the base; an image sensor disposed under the base at a position corresponding to the lens; a third coil disposed on the first substrate; a second magnet disposed on the image sensor and facing the third coil; and a flexible second substrate connecting the first substrate and the image sensor.

A camera device according to the present embodiment comprises: a mover coupled to a lens; a stator disposed to be spaced apart from the mover; a first substrate disposed on one side of the stator; a second substrate movably disposed on the first substrate; an image sensor disposed on the second substrate and comprising a first side; a second coil disposed on the first substrate; and a second magnet disposed on the second substrate and facing the second coil, wherein the first substrate comprises a first portion corresponding to the first side of the image sensor, and wherein the second substrate may comprise a plurality of flexible connecting portions coupled to the first portion of the first substrate.

The stator may comprise a housing and a first magnet disposed in the housing, and the mover may comprise a bobbin disposed in the housing, and a first coil disposed on the bobbin and facing the first magnet.

The mover comprises: a housing; a bobbin disposed in the housing; a first coil disposed on the bobbin; and a first magnet disposed in the housing and facing the first coil, wherein the stator may comprise a base disposed under the housing and a third coil disposed on the base and facing the first magnet.

Advantageous Effects

Through this embodiment, it is possible to implement an image stabilization function through image sensor shifting. Further, it is possible to provide a more precise image stabilization function through synchronization of image sensor shifting and lens shifting.

BEST MODE

Hereinafter, for convenience of explanation, some embodiments of the present invention will be described through exemplary drawings. However, the technical idea of the present invention is not limited to some of the described embodiments.

In describing the components of the embodiment of the present invention, terms such as first, second, A, B, (a), and (b) may be used. These terms are merely intended to distinguish the components from other components, and the terms do not limit the nature, order or sequence of the components.

When a component is described as being "connected" or "coupled" to another component, the component may be directly "connected", "coupled", or "jointed" to another component, but it should be understood that another component may be 'connected' or 'coupled' between the component and the other component.

The 'optical axis direction' used below is defined as the direction of the optical axis of a lens coupled to the lens driving device. Accordingly, the 'optical axis direction' may coincide with the direction of the optical axis of the image sensor of the camera module.

The "auto focus function" used below is defined as the function that automatically focuses on a subject by moving the lens in the direction of the optical axis according to the distance of the subject so that clear images of the subject can be obtained on the image sensor. Meanwhile, 'auto focus' can be used interchangeably with 'Auto Focus (AF)'.

The "image stabilization function" used below is defined as a function of moving or tilting a lens module in a direction perpendicular to the optical axis direction so as to cancel a vibration (movement) generated in an image sensor by an external force. Meanwhile, "image stabilization" may be used interchangeably with "optical image stabilization (OIS)".

Hereinafter, the configuration of the optical instrument according to the present embodiment will be described with reference to the drawings.

Figure 21:
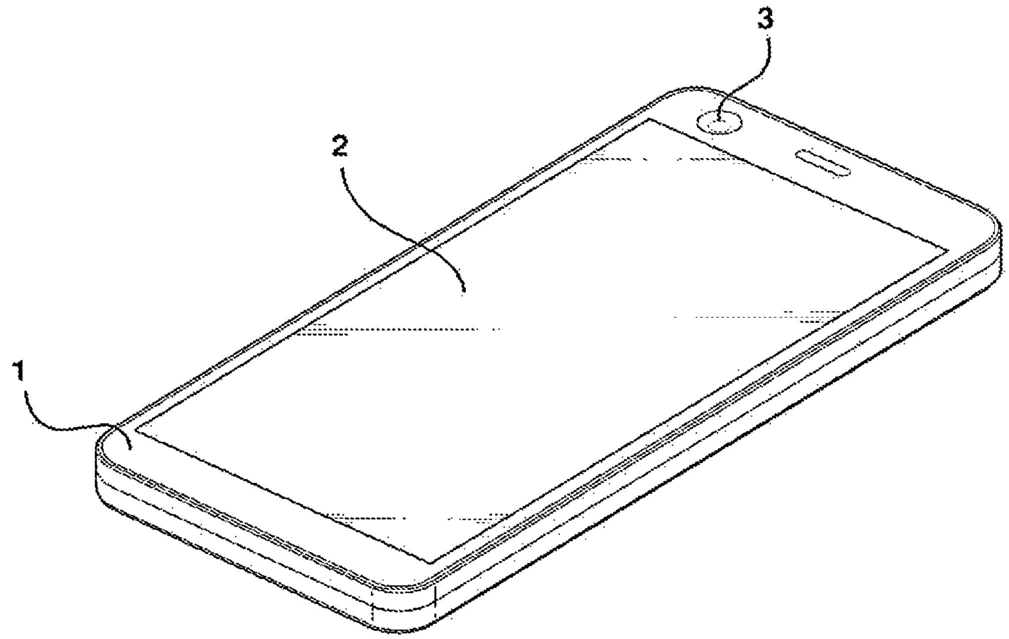
FIG. 21 is a perspective view showing an optical instrument according to the present embodiment.

FIG. 21 is a perspective view showing an optical instrument according to the present embodiment.

Optical instruments may be any one of hand phones, mobile phones, smart phones, portable communication devices, portable smart devices, digital cameras, laptop computers, digital broadcasting terminals, personal digital assistants (PDAs), portable multimedia players (PMPs), and navigation. However, the type of optical instrument is not limited thereto, and any device for photographing an image or a picture may be comprised in the optical instrument.

The optical instrument may comprise a main body 1. The main body 1 may form the outer appearance of an optical instrument. The main body 1 may accommodate a camera device 3. A display 2 may be disposed on one surface of the main body 1. For example, the display 2 and the camera device 3 may be disposed on one side of the main body 1, and the camera device 3 may be additionally disposed on the other side of the main body 1 (a side located on the opposite side of the main body 1.

The optical instrument may comprise a display 2. The display 2 may be disposed on one surface of the main body 1. The display 2 may output an image photographed by the camera device 3.

The optical instrument may comprise a camera device 3. The camera device 3 may be disposed on the main body 1. At least part of the camera device 3 may be accommodated in the body 1. The camera device 3 may be provided in plural. The camera device 3 may comprise a dual camera device. The camera device 3 may be disposed on one side of the main body 1 and the other side of the main body 1, respectively. The camera device 3 may photograph an image of a subject.

Hereinafter, the configuration of the camera device according to the first embodiment will be described with reference to the drawings.

Figure 1:
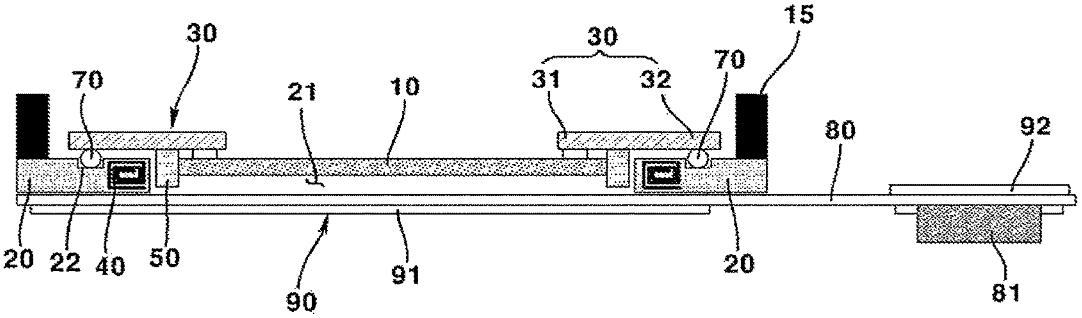
FIG. 1 is a schematic cross-sectional view showing a configuration related to an image sensor shifting of a camera device according to a first embodiment, and is a conceptual diagram.
Figure 2:
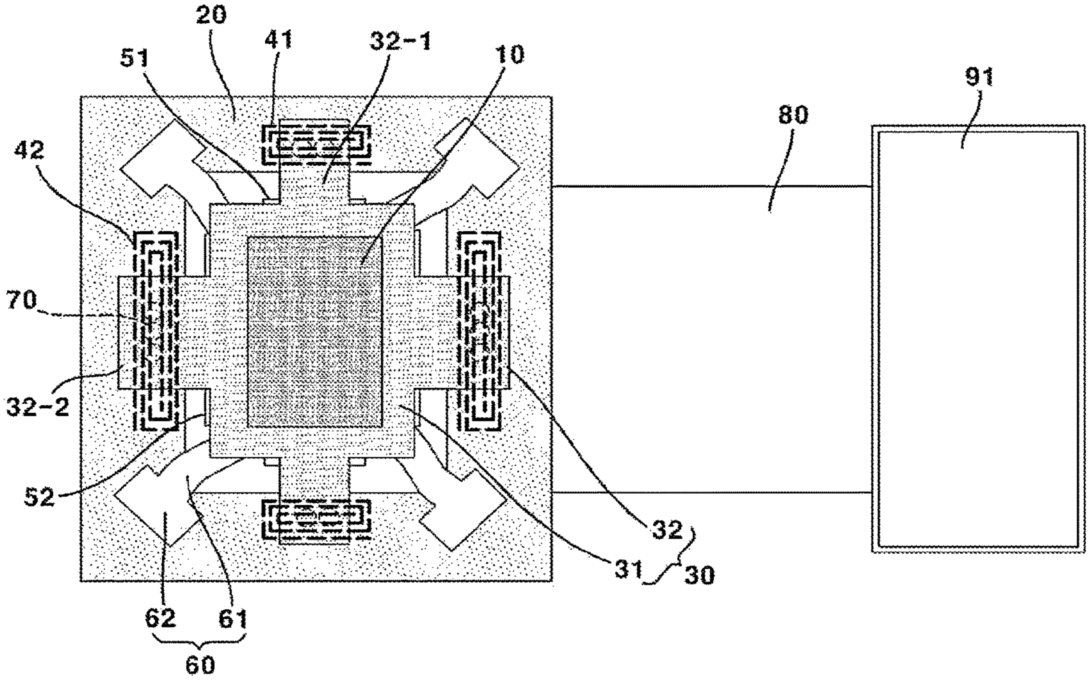
FIG. 2 is a plan view showing a configuration related to image sensor shifting of a camera device according to a first embodiment, and is a conceptual diagram.
Figure 19:
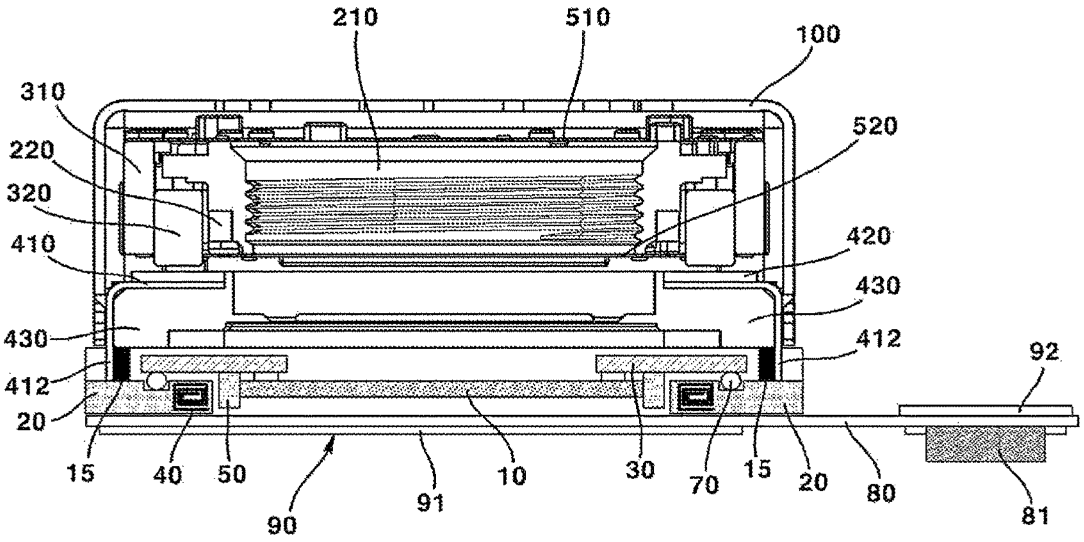
FIG. 19 is a cross-sectional view of a camera device according to the first embodiment.

FIG. 1 is a schematic cross-sectional view showing an image sensor shift-related configuration of a camera device according to a first embodiment, and is a conceptual diagram; FIG. 2 is a plan view showing an image sensor shift-related configuration of a camera device according to the first embodiment, and is a conceptual diagram; and FIG. 19 is a cross-sectional view of a camera device according to the first embodiment.

The camera device 3 may comprise an image sensor 10. The image sensor 10 may be disposed on one side of a stator 400. The image sensor 10 may be disposed under the stator 400. The image sensor 10 may be disposed at a position corresponding to the lens. The image sensor 10 may be disposed in a first substrate 20. The image sensor 10 may be electrically connected to the first substrate 20. The image sensor 10 may be disposed on a second substrate 30. The image sensor 10 may be flip chip coupled to the second substrate 30. The image sensor 10 may be coupled to the second substrate 30 by soldering. The image sensor 10 may be disposed so that the lens and the optical axis coincide. That is, the optical axis of the image sensor 10 and the optical axis of the lens may be aligned. The image sensor 10 may convert light irradiated to the effective image area of the image sensor 10 into an electrical signal. The image sensor 10 may be any one of a charge coupled device (CCD), a metal oxide semiconductor (MOS), a CPD, and a CID.

The camera device 3 may comprise a first substrate 20. The first substrate 20 may be a printed circuit board. The first substrate 20 may be a cavity PCB. The first substrate 20 may be a rigid substrate. The first substrate 20 may be a PCB comprising a hollow or a hole. A lens driving device may be disposed on the first substrate 20. In this case, a sensor base 15 may be disposed between the first substrate 20 and the lens driving device. The sensor base 15 comprises a groove, and a terminal portion 412 of a substrate 410 may be disposed in the groove of a sensor base 15. The first substrate 20 may be disposed on one side of the stator 400. The first substrate 20 may be disposed under the stator 400. The first substrate 20 may be electrically connected to the lens driving device. The first substrate 20 may be electrically connected to the image sensor 10. A fourth substrate 80 comprising a connection part 81 connected to the outside may be coupled to the other surface (lower surface) of the first substrate 20.

The first substrate 20 may comprise a hole 21. The hole 21 of the first substrate 20 may be formed in the center of the first substrate 20. The image sensor 10 may be disposed in the hole 21 of the first substrate 20. The hole 21 of the first substrate 20 may be formed in a shape corresponding to the image sensor 10. However, the size of the hole 21 of the first substrate 20 may be formed to be larger than the size of the image sensor 10 in order to secure the stroke space of the image sensor 10 within the hole 21 of the first substrate 20.

The first substrate 20 may comprise a groove 22. The groove 22 may be formed on the upper surface of the first substrate 20. The groove 22 may accommodate at least a portion of the ball 70. The groove 22 may be formed to have a width corresponding to the diameter of a ball 70 or a width greater than the diameter of the ball 70. The groove 22 may comprise four grooves spaced apart from each other. The ball 70 may be disposed in each of the four grooves. The four grooves may be formed at positions corresponding to the four extension parts 32. The groove 22 may be formed so that the ball 70 disposed in the groove 22 does not separate from the groove 22.

The camera device 3 may comprise a second substrate 30. The second substrate 30 may comprise a rigid substrate. The second substrate 30 may be movably disposed on the first substrate 20. The second substrate 30 may be coupled to one surface (upper surface) of the image sensor 10. The image sensor 10 may be flip-chip coupled to the second substrate 30. The image sensor 10 may be fixed to the second substrate 30. The second substrate 30 and the image sensor 10 can move integrally. The coupling between the second substrate 30 and the image sensor 10 may be performed by solder balls or Ag epoxy. The second substrate 30 may comprise a hollow or a hole. An optical path between the image sensor 10 and the lens may be formed through a hole or a hollow of the second substrate 30.

The second substrate 30 may comprise a coupling part 31. The coupling part 31 may be coupled to the image sensor 10. The coupling part 31 may have a rectangular frame shape. The coupling part 31 may overlap the image sensor 10 in the optical axis direction. The coupling part 31 may be disposed on the image sensor 10.

The second substrate 30 may comprise an extension part 32. The extension part 32 may extend outwardly from the coupling part 31 so that at least a portion of the extension part 32 may be overlapped with the first substrate 20 in the optical axis direction. The extension part 32 may be supported by the ball 70. The extension part 32 may be formed to be rigid.

The extension part 32 may comprise a plurality of extension parts. The extension part 32 may comprise four extension parts 32. The extension part 32 may comprise a first extension part 32-1 disposed in a first axis direction with respect to the image sensor 10 and a second extension part 32-2 disposed in a second axis direction perpendicular to the first axis with respect to the image sensor 10. In this case, one of the first axis and the second axis may be an x-axis and the other may be a y-axis. Each of the first extension part 32-1 and the second extension part 32-2 may comprise two extension parts disposed at the opposite side from each other.

The camera device 3 may comprise a second coil 40. The second coil 40 may be disposed on the first substrate 20. The second coil 40 may be disposed on the inner side surface of the hole 21 of the first substrate 20. The second coil 40 may be formed as a pattern coil on the first substrate 20. The second coil 40 may be integrally formed with the first substrate 20 as a fine pattern coil. The second coil 40 may be overlapped with the ball 70 in the optical axis direction. Through this structure, the size of the first substrate 20 in the x-axis/y-axis direction can be minimized. When current is applied to the second coil 40, the second coil 40 may electromagnetically interact with a second magnet 50.

The second coil 40 may comprise a plurality of coils. The second coil 40 may comprise a 2-1 coil 41 disposed in the first axis direction with respect to the image sensor 10 and a 2-2 coil 42 disposed on a second axis direction perpendicular to the first axis with respect to the image sensor 10. In the first embodiment, when a current is applied to the 2-1 coil 41, the image sensor 10 moves in the direction of the first axis, and when current is applied to the 2-2 coil 42, the image sensor 10 can be moved in the direction of the second axis.

The camera device 3 may comprise a second magnet 50. The second magnet 50 may be disposed on the second substrate 30. The second magnet 50 may be disposed on the image sensor 10. The second magnet 50 may be moved integrally with the image sensor 10. The second magnet 50 may be disposed to be spaced apart from the image sensor 10. The second magnet 50 may be facing the second coil 40. The second magnet 50 may be disposed on the outer side surface of the image sensor 10. The second magnet 50 may be fixed to the second substrate 30 by an adhesive.

The second magnet 50 may comprise a 2-1 magnet 51 facing the 2-1 coil 41 and a 2-2 magnet 52 facing the 2-2 coil 42. Each of the 2-1 magnet 51 and the 2-2 magnet 52 may comprise two magnets.

In the first embodiment, image sensor shifting can be performed through the second magnet 50 disposed on the second substrate 30 or the image sensor 10 and the second coil 40 disposed on the first substrate 20. That is, when current is applied to the second coil 40, the second magnet 50 moves due to the electromagnetic interaction between the second coil 40 and the second magnet 50, and at this time, as the image sensor 10 being moved integrally with the second magnet 50 is moved together, an image stabilization (OIS) function can be performed. The OIS driving of the image sensor shifting method of the first embodiment has the advantage of reducing the size of the lens and the lens driving device because there is no movement of the lens compared to the OIS driving of a lens shifting method. In particular, the size may be reduced in the x-axis/y-axis direction. In addition, in a lens shifting method, disconnection of a wire for supporting the movement of the lens may occur, but in an image sensor shifting method, this problem can be solved.

In the first embodiment, OIS may be performed only by shifting the image sensor 10, but a more precise OIS function may be performed by synchronizing the movement of the image sensor 10 and the movement of the lens. That is, the image sensor 10 and the lens may move in the same direction by the same distance. When a synchronized shifting between the image sensor 10 and the lens according to the first embodiment is performed, even when the camera device is shaken by the user's hand shaking of the camera device, a state in which there is no movement between the image sensor 10 and the lens at all is maintained, and thus, perfect image stabilization can be performed. That is, the synchronized shifting structure between the image sensor 10 and the lens according to the first embodiment can provide enhanced image stabilization (OIS) function compared to a structure in which only the image sensor 10 is shifted or only the lens is shifted.

In the first embodiment, the second coil 40 is disposed on the first substrate 20 and the second magnet 50 is disposed on the second substrate 30, but in the modified embodiment, the second magnet 50 is disposed on the first substrate 20 and the second coil may be disposed on the second substrate 30.

The camera device 3 may comprise a third substrate 60. The third substrate 60 may comprise a flexible substrate. The third substrate 60 may be a flexible printed circuit board (FPCB). The third substrate 60 may electrically connect the first substrate 20 and the image sensor 10. The third substrate 60 may connect the second substrate 30 and the first substrate 20. The third substrate 60 may be coupled to the upper surface of the first substrate 20. The third substrate 60 may be coupled to an anisotropic conductive film (ACF) or flip chip to the cavity PCB of the first substrate 20. The coupling between the third substrate 60 and the first substrate 20 may be performed by solder balls or Ag epoxy. The third substrate 60 may be extended from the side surface of the second substrate 30. The second substrate 30 and the third substrate 60 may be a rigid flexible printed circuit board (RFPCB) formed integrally. At this time, the second substrate 30 may comprise a rigid substrate and the third substrate 60 may comprise a flexible substrate. The third substrate 60 may electrically connect the image sensor 10 and the first substrate 20 while being bent or unfolded. The third substrate 60 may be disposed at a corner of the second substrate 30.

The third substrate 60 may comprise a plurality of third substrates. The third substrate 60 may comprise four third substrates. The four third substrates may be disposed to be symmetrical to each other. Among the four third substrates, two third substrates may be disposed in a third axis direction, and the remaining two third substrates may be disposed in a fourth axis direction. The third substrate 60 may be disposed between the first extension part 32-1 and the second extension part 32-2 of the second substrate 30. The third substrate 60 may be disposed at the corner side of the image sensor 10. The third substrate 60 may be disposed between the first axis and the second axis. The third substrate 60 may be disposed in a space between the first axis and the second axis. At this time, the first axis may be an axis in a direction in which the first extension part 32-1 is disposed and the second axis may be an axis in a direction in which the second extension part 32-2 is disposed.

The third substrate 60 may comprise a connection part 61 connected to the second substrate 30 and a coupling part 62 formed at the end of the connection part 61 and coupled to the upper surface of the first substrate 20. In the first embodiment, the connection part 61 may be disposed in a diagonal direction with respect to the image sensor 10.

The camera device 3 may comprise a ball 70. The ball 70 may be disposed between the first substrate 20 and the second substrate 30. The ball 70 may be disposed in the groove 22 of the first substrate 20. The ball 70 may be disposed between the extension part 32 of the first substrate 20 and the second substrate 30. The ball 70 may movably support the second substrate 30. The ball 70 may comprise a 'guide ball'. The ball 70 may comprise a plurality of balls. The ball 70 comprises a total of 12 balls, and three balls support one extension part 32, so that a total of 12 balls may support four extension parts 32. The ball 70 may be rotatably accommodated in the groove 22 of the first substrate 20. The ball 70 may have a spherical shape.

The camera device 3 may comprise a fourth substrate 80. The fourth substrate 80 may be a printed circuit board. The fourth substrate 80 may comprise an FPCB. The fourth substrate 80 may be coupled to the other surface (lower surface) of the first substrate 20. The fourth substrate 80 may comprise a connection part 81 connected to the outside. The connection part 81 may comprise a connector. The connection part 81 may be connected to a component of an optical instrument in the outside of the camera device 3.

The camera device 3 may comprise a reinforcing plate 90. The reinforcing plate 90 may be coupled to the fourth substrate 80. The reinforcing plate 90 may be formed of a stainless steel (SUS). The reinforcing plate 90 may comprise a first reinforcing plate 91 disposed on a lower surface of the fourth substrate 80 at a position corresponding to the first substrate 20. The reinforcing plate 90 may comprise a second reinforcing plate 92 disposed at a position corresponding to the connection part 81 on the upper surface of the fourth substrate 80.

The camera device 3 may comprise a lens module. The lens module may comprise at least one lens. The lens module may comprise a barrel and a plurality of lenses coupled to the inside of the barrel. The lens module may be coupled to a bobbin 210 of the lens driving device. The lens module may be coupled to the bobbin 210 by screw-coupling and/or an adhesive. The lens module can move integrally with the bobbin 210. The lens may be coupled to movers 200 and 300. The lens may be coupled to a first mover 200.

The camera device 3 may comprise a filter. The filter may be an infrared filter. The infrared filter may block light in the infrared region from entering into the image sensor 10. The infrared filter may be disposed between the lens and the image sensor 10. For example, the infrared filter may be disposed on the sensor base 15 disposed between the lens driving device and the first substrate 20. As another example, the infrared filter may be disposed on a base 430.

The camera device 3 may comprise a controller. The controller may be disposed on the first substrate 20. The controller may individually control the direction, intensity, and amplitude of current supplied to a first coil 422, the second coil 40, and a third coil 220 of the lens driving device. The controller may perform an auto focus function and/or an image stabilization function by controlling the lens driving device. Furthermore, the controller may perform auto focus feedback control and/or image stabilization feedback control for the lens driving device.

Figure 3:
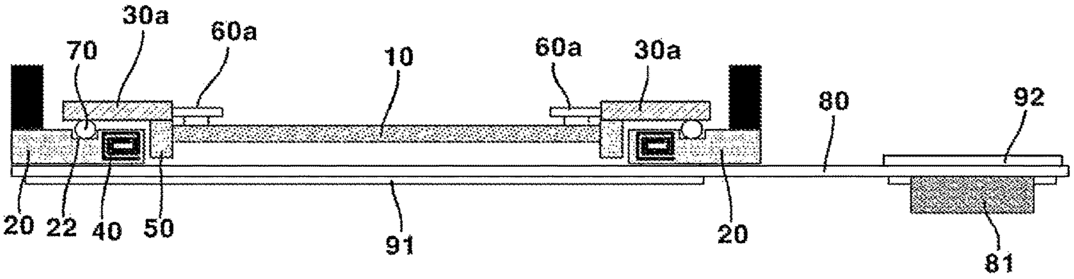
FIG. 3 is a schematic cross-sectional view showing a configuration related to image sensor shifting of a camera device according to a modified embodiment of a first embodiment, and is a conceptual diagram.

FIG. 3 is a schematic cross-sectional view showing a configuration related to image sensor shifting of a camera device according to a modified embodiment of the first embodiment, and is a conceptual diagram.

The modified embodiment may comprise a fifth substrate 30*a* and a sixth substrate 60*a* which are modified forms of the second substrate 30 and the third substrate 60 of the first embodiment. The sixth substrate 60*a* may be extended from the inner side surface of the fifth substrate 30*a*. At this time, the image sensor 10 may be flip-chip coupled to the sixth substrate 60*a*. The sixth substrate 60*a* may be coupled to the upper surface of the first substrate 20. That is, one end portion of the sixth substrate 60*a* may be coupled to the image sensor 10 and the other end portion of the sixth substrate 60*a* may be coupled to the first substrate 20.

Figure 4:
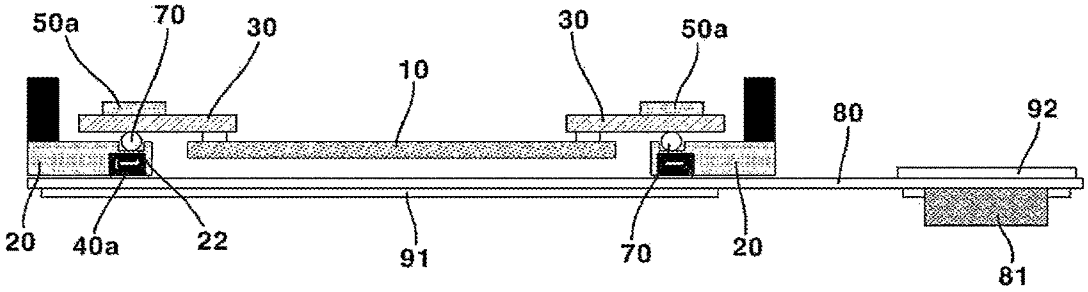
FIG. 4 is a schematic cross-sectional view showing an image sensor shift-related configuration of a camera device according to another modified embodiment of a first embodiment, and is a conceptual diagram.

FIG. 4 is a schematic cross-sectional view showing an image sensor shift-related configuration of a camera device according to another modified embodiment of a first embodiment, and is a conceptual diagram.

Another modified embodiment may comprise a fourth coil 40*a* and a fifth magnet 50*a* which are the modified form of the second coil 40 and the second magnet 50 of the first embodiment. The fifth magnet 50*a* may be disposed on the upper surface of the second substrate 30. The fifth magnet 50*a* may be overlapped the fourth coil 40*a* in the optical axis direction. The fourth coil 40*a* may be disposed under the ball 70. The fourth coil 40*a* may be overlapped with the ball 70 in the optical axis direction. The ball 70 may be disposed between the fourth coil 40*a* and the fifth magnet 50*a* in the optical axis direction. According to another modified embodiment, the size of the first substrate 20 in the x-axis/y-axis direction may be reduced compared to the first embodiment.

Figure 5:
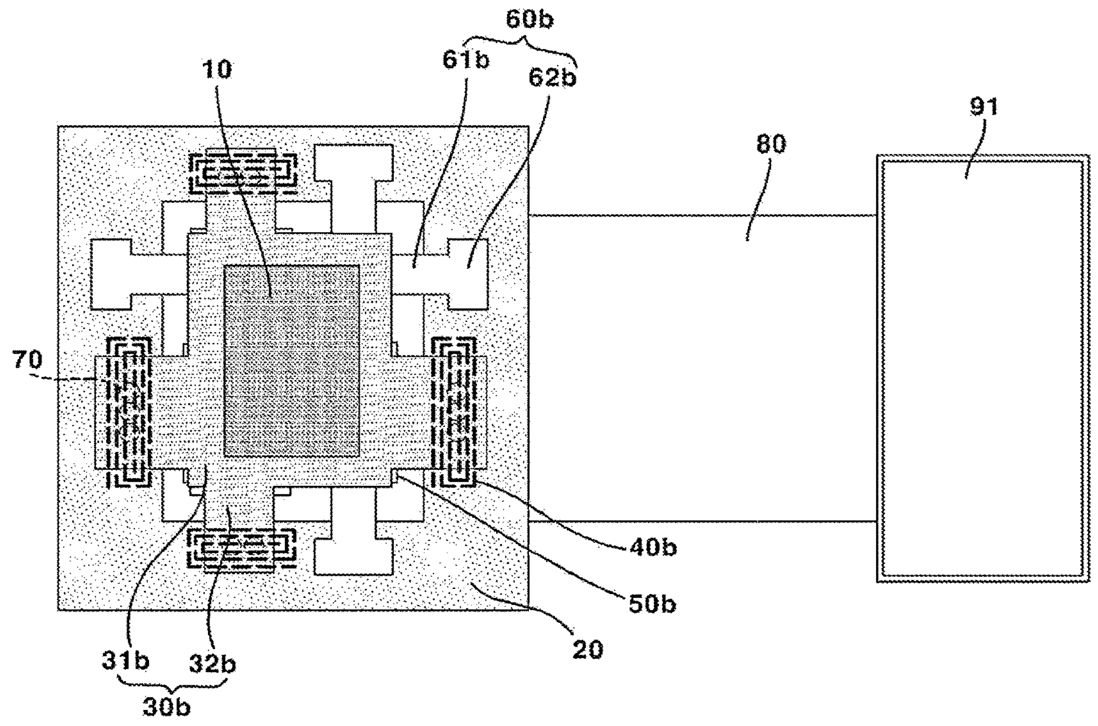
FIG. 5 is a plan view showing a configuration related to an image sensor shifting of a camera device according to another modified embodiment of a first embodiment, and is a conceptual diagram.

FIG. 5 is a plan view showing a configuration related to an image sensor shifting of a camera device according to another modified embodiment of a first embodiment, and is a conceptual diagram.

Yet another modified embodiment may comprise the seventh substrate 30*b*, a fifth coil 40*b*, a sixth magnet 50*b*, an eighth substrate 60*b*, and a ball 70*b* which are modified forms of the second substrate 30, the second coil 40, the second magnet 50, the third substrate 60, and the ball 70 of the first embodiment.

The seventh substrate 30*b* may comprise a coupling part 31*b* and an extension part 32*b*. However, compared with the first embodiment, the location of the extension part 32*b* may be changed. In the first embodiment, the extension part 32 is disposed at the center of one side wall of the coupling part 31, but in another modified embodiment, the extension part 32*b* may be disposed to be biased toward the corner side from one side of the coupling part 31*b*. Through this, the eighth substrate 60*b* may be disposed from one side of the coupling part 31*b* to the other corner side. That is, the eighth substrate 60*b* may be disposed on a side (edge) of the coupling part 31*b* rather than a corner. The ball 70*b* may be disposed to be biased toward a corner side of the first substrate 20 to support the extension part 32*b*. The fifth coil 40*b* may be disposed to be biased toward a corner side of the first substrate 20. The sixth magnet 50*b* may be disposed to face the fifth coil 40*b* at a corner side of the coupling part 31*b*. The eighth substrate 60*b* may comprise a connection part 61*b* extending in the x-axis or y-axis direction from the coupling part 31*b*, and a coupling part 62*b* coupled to the first substrate 20. The eighth substrate 60*b* may be disposed in parallel with the extension part 32*b*. The eighth substrate 60*b* may be disposed to be spaced apart from the extension part 32*b*. The eighth substrate 60*b* may be disposed in a direction corresponding to the extension part 32*b*. The eighth substrate 60*b* may be disposed in the same direction as the extension part 32*b*.

Hereinafter, a configuration of a camera device according to a second embodiment will be described with reference to the drawings.

Figure 6:
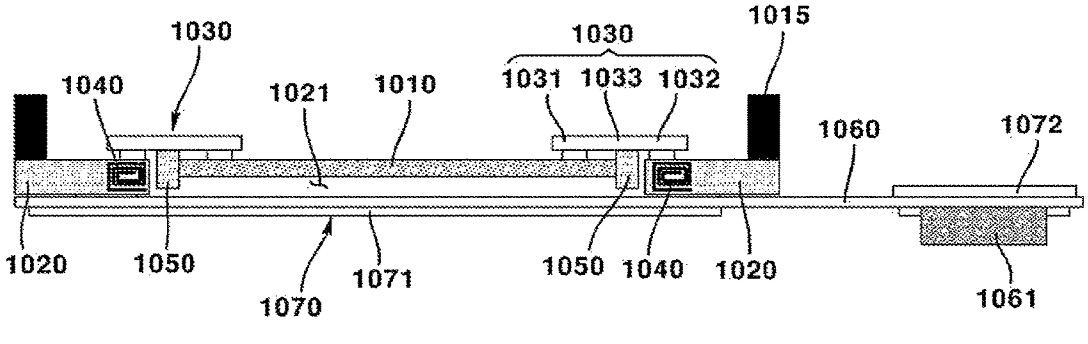
FIG. 6 is a schematic cross-sectional view showing a configuration related to an image sensor shifting of a camera device according to a second embodiment, and is a conceptual diagram.
Figure 7:
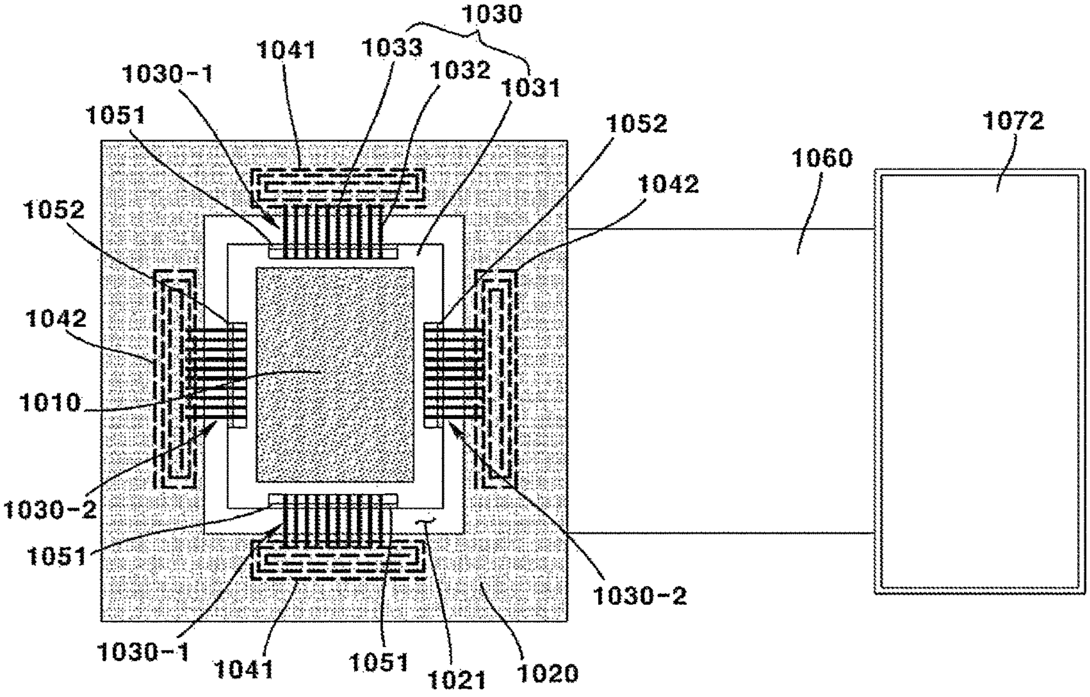
FIG. 7 is a plan view showing a configuration related to image sensor shifting of a camera device according to a second embodiment, and is a conceptual diagram, and is a conceptual diagram.
Figure 20:
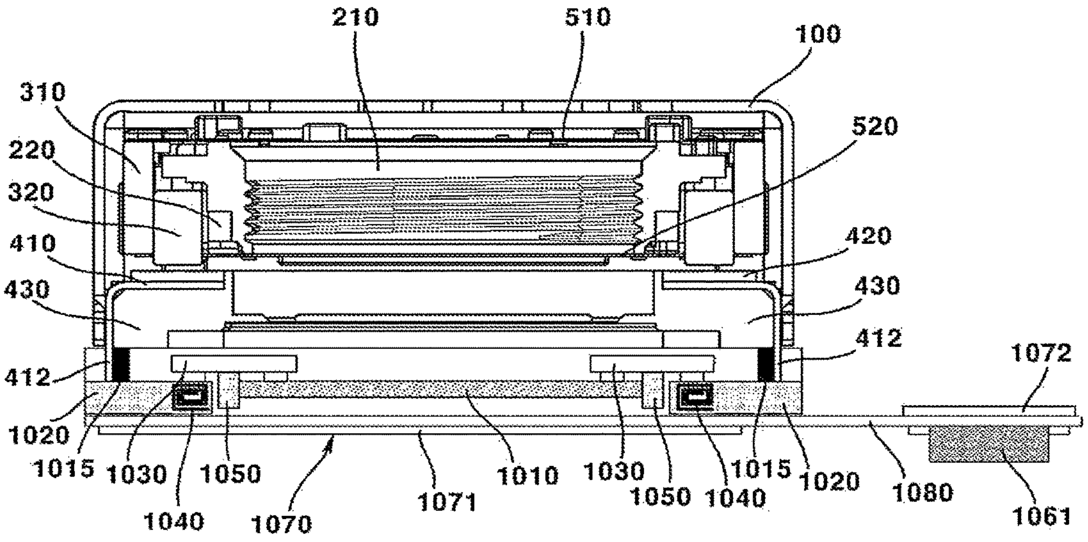
FIG. 20 is a cross-sectional view of a camera device according to a second embodiment.

FIG. 6 is a schematic cross-sectional view showing a configuration related to an image sensor shifting of a camera device according to a second embodiment, and is a conceptual diagram; FIG. 7 is a plan view showing a configuration related to image sensor shifting of a camera device according to a second embodiment, and is a conceptual diagram; and FIG. 20 is a cross-sectional view of a camera device according to a second embodiment.

The camera device 3 may comprise an image sensor 1010. The image sensor 1010 may be disposed on one side of the stator 400. The image sensor 1010 may be disposed under the stator 400. The image sensor 1010 may be disposed at a position corresponding to the lens. The image sensor 1010 may be electrically connected to a first substrate 1020. The image sensor 1010 may be flip chip coupled to a second substrate 1030. The image sensor 1010 may be disposed so that the lens and the optical axis coincide. That is, the optical axis of the image sensor 1010 and the optical axis of the lens may be aligned. The image sensor 1010 may convert light irradiated to the effective image area of the image sensor 1010 into an electrical signal. The image sensor 1010 may be any one of a charge coupled device (CCD), a metal oxide semiconductor (MOS), a CPD, and a CID. The image sensor 1010 may comprise a first side. The image sensor 1010 may comprise a plurality of sides. The image sensor 1010 may comprise four sides. The image sensor 1010 may comprise first to fourth sides. The plurality of sides of the image sensor 1010 may be formed as the plurality of side surfaces of the image sensor 1010 meet the upper surface or the lower surface of the image sensor 1010.

The camera device 3 may comprise a first substrate 1020. The first substrate 1020 may be a printed circuit board. The first substrate 1020 may be a cavity PCB. The first substrate 1020 may be a rigid substrate. The first substrate 1020 may be a hollow or a PCB comprising a hole. A lens driving device may be disposed on the first substrate 1020. At this time, a sensor base 1015 may be disposed between the first substrate 1020 and the lens driving device. The sensor base 1015 may comprise a groove, and a terminal portion 412 of the substrate 410 may be disposed in the groove of the sensor base 1015. The first substrate 1020 may be disposed on one side of the stator 400. The first substrate 1020 may be disposed under the stator 400. The first substrate 1020 may be electrically connected to the lens driving device. The first substrate 1020 may be electrically connected to the image sensor 1010. A third substrate 1060 comprising a connection part 1061 connected to the outer side may be coupled to the other surface (lower surface) of the first substrate 1020.

The first substrate 1020 may comprise a first portion corresponding to the first side of the image sensor 1010. The first substrate 1020 may comprise a second portion corresponding to the second side of the image sensor 1010. The first substrate 1020 may comprise a third portion corresponding to the third side of the image sensor 1010. The first substrate 1020 may comprise a fourth portion corresponding to the fourth side of the image sensor 1010. Each of the first to fourth portions of the first substrate 1020 may be connected to a connection part 1033 of the second substrate 1030. That is, the second substrate 1030 comprises a unit of the connection part 1033 divided into four areas, and the unit of the connection part 1033 may be connected to the first to fourth portions, respectively.

The first substrate 1020 may comprise a hole 1021. The hole 1021 of the first substrate 1020 may be formed in the center of the first substrate 1020. An image sensor 1010 may be disposed in the hole 1021 of the first substrate 1020. The hole 1021 of the first substrate 1020 may be formed in a shape corresponding to the image sensor 1010. However, the size of the hole 1021 of the first substrate 1020 may be formed to be larger than the size of the image sensor 1010 so that the stroke space of the image sensor 1010 can be secured inside the hole 1021 of the first substrate 1020.

The camera device 3 may comprise a second substrate 1030. The second substrate 1030 may be a flexible substrate. The second substrate 1030 may be a flexible printed circuit board (FPCB). The second substrate 1030 may connect the first substrate 1020 and the image sensor 1010. The second substrate 1030 may be coupled to one surface (upper surface) of the image sensor 1010 and one surface (upper surface) of the first substrate 1020. The image sensor 1010 may be flip-chip coupled to the second substrate 1030. The second substrate 1030 may be coupled to an anisotropic conductive film (ACF) or flip chip to the cavity PCB of the first substrate 1020. A portion of the lower surface of the second substrate 1030 may be coupled to the upper surface of the image sensor 1010, and another portion of the lower surface of the second substrate 1030 may be coupled to the upper surface of the first substrate 1020. The coupling between the second substrate 1030 and the image sensor 1010 and the coupling between the second substrate 1030 and the first substrate 1020 may be performed by solder balls or Ag epoxy.

The second substrate 1030 may comprise a 2-1 substrate 1010-1 that connects the first substrate 1020 and the image sensor 1010 in a first axis direction, and a 2-2 substrate 1030-2 that connects the first substrate 1020 and the image sensor 1010 in a second axis direction perpendicular to the first axis. At this time, one of the first axis and the second axis may be an x axis and the other may be a y axis. Each of the 2-1 substrate 1030-1 and the 2-2 substrate 1030-2 may comprise two substrates. The 2-1 substrate 1010-1 supports the movement of the image sensor 1010 in the first axis direction, and the 2-2 substrate 1030-2 may support the movement of the image sensor 1010 in the second axis direction.

The second substrate 1030 may comprise an inner side portion 1031 coupled with the image sensor 1010, an outer side portion 1032 coupled with the first substrate 1020, and a flexible connection part 1033 that connects the inner side portion 1031 and the outer side portion 1032. The inner side portion 1031 may have a rectangular frame shape. The inner side portion 1031 comprises a hole, and an optical path between the image sensor 1010 and the lens may be formed through the hole in the inner side portion 1031. The outer side portion 1032 may comprise four outer side portions 1032 spaced apart from each other. At this time, two outer side portions 1032 of the four outer side portions 1032 are disposed in the first axis direction with respect to the image sensor 1010, and the other two outer side portions 1032 may be disposed in the second axis direction with respect to the image sensor 1010. The connection part 1033 may comprise four connection parts 1033 that are spaced apart from each other. The four connection parts 1033 may be connected to the four outer side portions 1032, respectively. Each of the four connection parts 1033 may comprise a plurality of conductive lines. The plurality of conductive lines may be formed of a plurality of strands spaced apart from each other. The plurality of conductive lines may comprise 10 conductive lines. The connection part 1033 has elasticity and may elastically support the movement of the image sensor 1010. That is, the second substrate 1030 may movably support the image sensor 1010.

The camera device 3 may comprise a second coil 1040. The second coil 1040 may be disposed on the first substrate 1020. The second coil 1040 may be disposed on the inner side surface of the hole 1021 of the first substrate 1020. The second coil 1040 may be formed as a pattern coil on the first substrate 1020. The second coil 1040 may be integrally formed with the first substrate 1020 as a fine pattern coil.

The second coil 1040 may comprise a plurality of coils. The second coil 1040 may comprise a 2-1 coil 1041 disposed in a first axis direction with respect to the image sensor 1010 and a 2-2 coil 1042 disposed in a second axis direction perpendicular to the first axis with respect to the image sensor 1010. In a second embodiment, when current is applied to the 2-1 coil 1041, the image sensor 1010 moves in the direction of the first axis, and when current is applied to the 2-2 coil 1042, the image sensor 1010 may move in the second axis direction.

The camera device 3 may comprise a second magnet 1050. The second magnet 1050 may be disposed on the image sensor 1010. The second magnet 1050 can move integrally with the image sensor 1010. The second magnet 1050 may be coupled to the inner side portion 1031 of the second substrate 1030 being coupled to the image sensor 1010. At this time, the second magnet 1050 may be disposed to be spaced apart from the image sensor 1010. However, even in this case, the second magnet 1050 and the image sensor 1010 can move integrally. The second magnet 1050 may face the second coil 1040. The second magnet 1050 may be disposed on the outer side surface of the image sensor 1010. The second magnet 1050 may be fixed to the second substrate 1030 by an adhesive.

The second magnet 1050 may comprise a 2-1 magnet 1051 facing the 2-1 coil 1041 and a 2-2 magnet 1052 facing the 2-2 coil 1042. Each of the 2-1 magnet 1051 and the 2-2 magnet 1052 may comprise two magnets.

In the second embodiment, image sensor shifting may be performed through the second magnet 1050 disposed on the image sensor 1010 and the second coil 1040 disposed on the first substrate 1020. That is, when current is applied to the second coil 1040, the second magnet 1050 moves due to the electromagnetic interaction between the second coil 1040 and the second magnet 1050, and at this time, as the image sensor 1010 that moves integrally moves together, image stabilization (OIS) function may be performed. The OIS driving of the image sensor shifting method of the second embodiment has the advantage of reducing the size of the lens and the lens driving device because there is no lens movement compared to the OIS driving of the lens shifting method. In particular, the size may be reduced in the x-axis/y-axis direction. In addition, in the lens shifting method, disconnection of a wire that supports the movement of the lens may occur, but in the image sensor shifting method, this problem can be solved.

In the second embodiment, OIS may be performed only by shifting the image sensor 1010, but a more precise OIS function may be performed by synchronizing the movement of the image sensor 1010 and the movement of the lens. That is, the image sensor 1010 and the lens may move in the same direction by the same distance. When a synchronization shifting between the image sensor 1010 and the lens according to the second embodiment is performed, even when the camera device is shaken by the user's hand shaking of the camera device, the image sensor 1010 and the lens are kept in a state of no movement between them, and therefore, a perfect image stabilization can be performed. That is, the synchronization shift structure between the image sensor 1010 and the lens according to the second embodiment may provide enhanced image stabilization (OIS) function compared to a structure in which only the image sensor 1010 is shifted or only the lens is shifted.

In the second embodiment, the second coil 1040 is disposed on the first substrate 1020 and the second magnet 1050 is disposed on the second substrate 1030, but in the modified embodiment, the second magnet 1050 is disposed on the first the substrate 1020 and the second coil 1040 may be disposed on the second substrate 1030.

The camera device 3 may comprise a third substrate 1060. The third substrate 1060 may be a printed circuit board. The third substrate 1060 may comprise an FPCB. The third substrate 1060 may be coupled to the other surface (lower surface) of the first substrate 1020. The third substrate 1060 may comprise a connection part 1061 connected to the outer side. The connection part 1061 may comprise a connector. The connection part 1061 may be connected to a configuration of an optical instrument in the outside of the camera device 3.

The camera device 3 may comprise a reinforcing plate 1070. The reinforcing plate 1070 may be coupled to the third substrate 1060. The reinforcing plate 1070 may be formed of a stainless steel (SUS). The reinforcing plate 1070 may comprise a first reinforcing plate 1071 disposed at a position corresponding to the first substrate 1020 on the lower surface of the third substrate 1060. The reinforcing plate 1070 may comprise a second reinforcing plate 1072 disposed at a position corresponding to the connection part 1061 on the upper surface of the third substrate 1060.

The camera device 3 may comprise a lens module. The lens module may comprise at least one lens. The lens module may comprise a barrel and a plurality of lenses coupled to the inside of the barrel. The lens module may be coupled to the bobbin 210 of the lens driving device. The lens module may be coupled to the bobbin 210 by screw-coupling and/or an adhesive. The lens module can move integrally with the bobbin 210. The lens may be coupled to the movers 200 and 300. The lens may be coupled to the first mover 200.

The camera device 3 may comprise a filter. The filter may comprise an infrared filter. The infrared filter may block the incident of light in the infrared region to the image sensor 1010. The infrared filter may be disposed between the lens and the image sensor 1010. For example, the infrared filter may be disposed on the sensor base 1015 disposed between the lens driving device and the first substrate 1020. As another example, the infrared filter may be disposed on the base 430.

The camera device 3 may comprise a controller. The controller may be disposed on the first substrate 1020. The controller may individually control the direction, intensity, and amplitude of the current supplied to the first coil 422, the second coil 1040, and the third coil 220 of the lens driving device. The controller may perform an auto focus function and/or an image stabilization function by controlling the lens driving device. Further, the controller may perform auto focus feedback control and/or image stabilization feedback control for the lens driving device.

Figure 8:
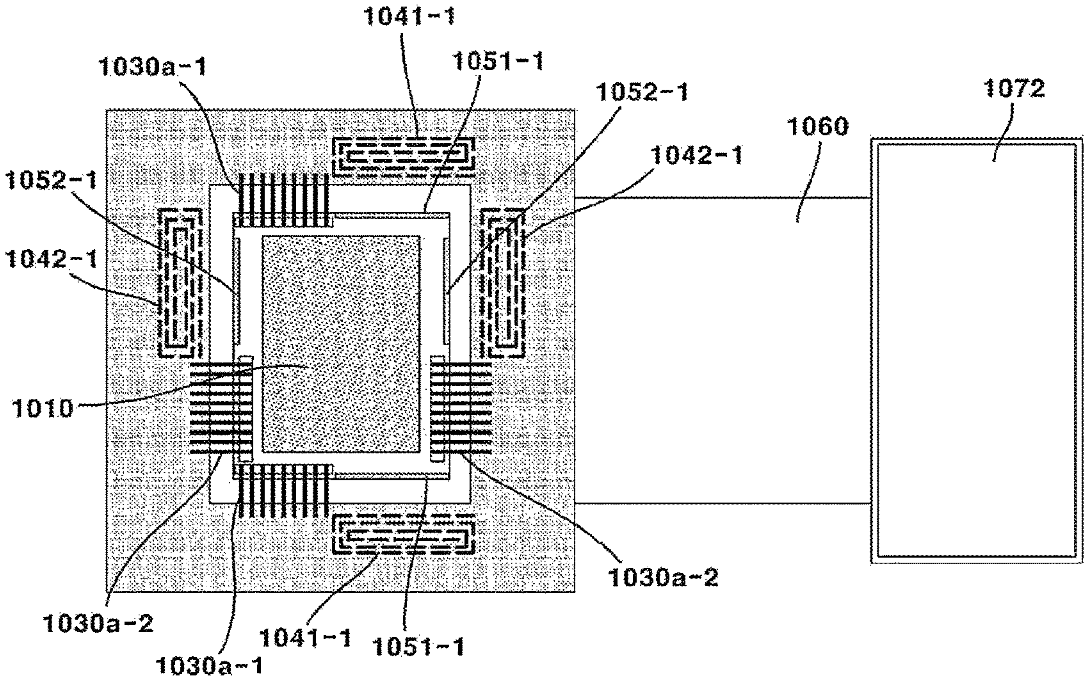
FIG. 8 is a plan view showing a configuration related to an image sensor shifting of a camera device according to a modified embodiment of a second embodiment, and is a conceptual diagram.

FIG. 8 is a plan view showing a configuration related to an image sensor shifting of a camera device according to a modified embodiment of a second embodiment, and is a conceptual diagram.

In a modified embodiment, the positions of the second coil 1040, the second magnet 1050, and the connection part 1033 of the second substrate 1030 may be changed compared to the second embodiment. In a modified embodiment, the second coil 1040 may comprise a 2-3 coil 1041-1 disposed in a first axis direction of the image sensor 1010, and 2-4 coils 1042-1 disposed in a second axis direction of the image sensor 1010. At this time, the first axis and the second axis may be perpendicular to each other. The 2-3 coil 1041-1 and the 2-4 coil 1042-1 may not be overlapped with the connection part 1033 of the second substrate 1030 in a vertical direction. That is, in the modified example, the second coil 1040 and the connection part 1033 of the second substrate 1030 may be disposed so as not to be interfered with each other. In a modified embodiment, the second magnet 1050 may comprise a 2-3 magnet 1051-1 facing the 2-3 coil 1041-1 and a 2-4 magnet 1052-1 facing the 2-4 coil 1042-1.

Figure 9:
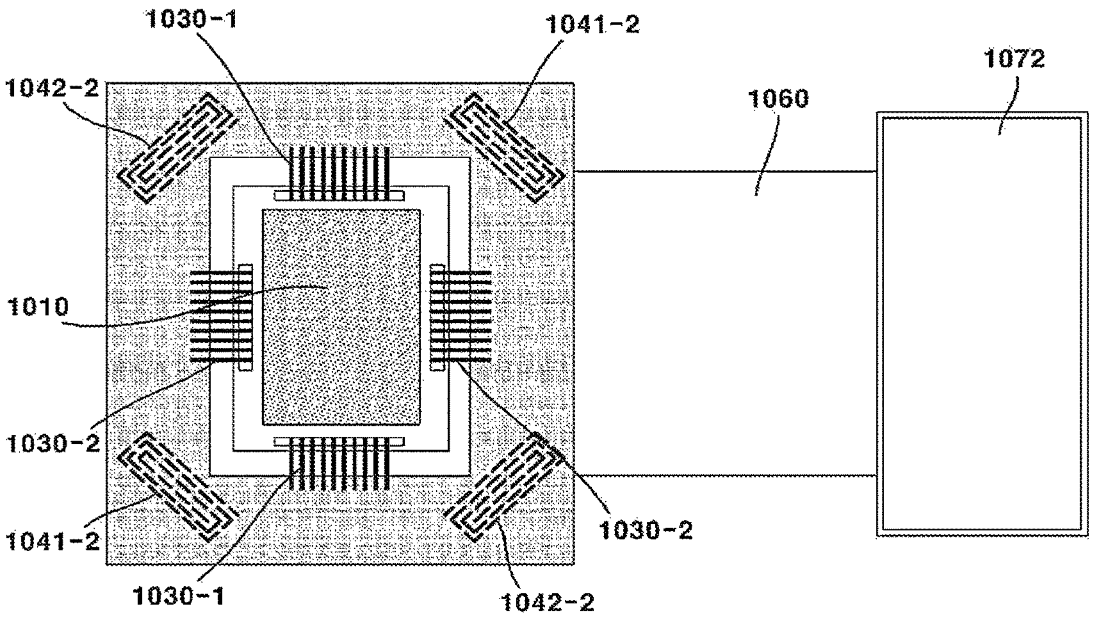
FIG. 9 is a plan view showing a configuration related to an image sensor shifting of a camera device according to another modified embodiment of a second embodiment, and is a conceptual diagram.

FIG. 9 is a plan view showing a configuration related to an image sensor shifting of a camera device according to another modified embodiment of a second embodiment, and is a conceptual diagram.

In another modified embodiment, the positions of the second coil 1040 and the second magnet 1050 may be changed compared to the second embodiment. In another modification, the second coil 1040 and the second magnet 1050 may be disposed at a corner side of the image sensor 1010. In the second embodiment and the previous modified embodiment, the second coil 1040 and the second magnet 1050 are different from those disposed on the side surface of the image sensor 1010. In another modified embodiment, the second coil 1040 may comprise a 2-5 coils 1041-2 disposed in a first axis direction, which is a diagonal direction of the image sensor 1010, and a 2-6 coil 1042-2 disposed in a second axis direction of the image sensor 1010. At this time, the first axis and the second axis may be perpendicular to each other. The 2-5 coil 1041-2 and the 2-6 coil 1042-2 may not vertically overlap the connection part 1033 of the second substrate 1030. That is, in another modified embodiment, the second coil 1040 and the connection part 1033 of the second substrate 1030 may be disposed so as not to be interfered with each other. In another modified embodiment, the second magnet 1050 may comprise a 2-5 magnet facing the 2-5 coil 1041-2 and a 2-6 magnet facing the 2-6 coil 1042-2.

Hereinafter, a configuration of a lens driving device according to the present embodiment will be described with reference to the drawings.

Figure 10:
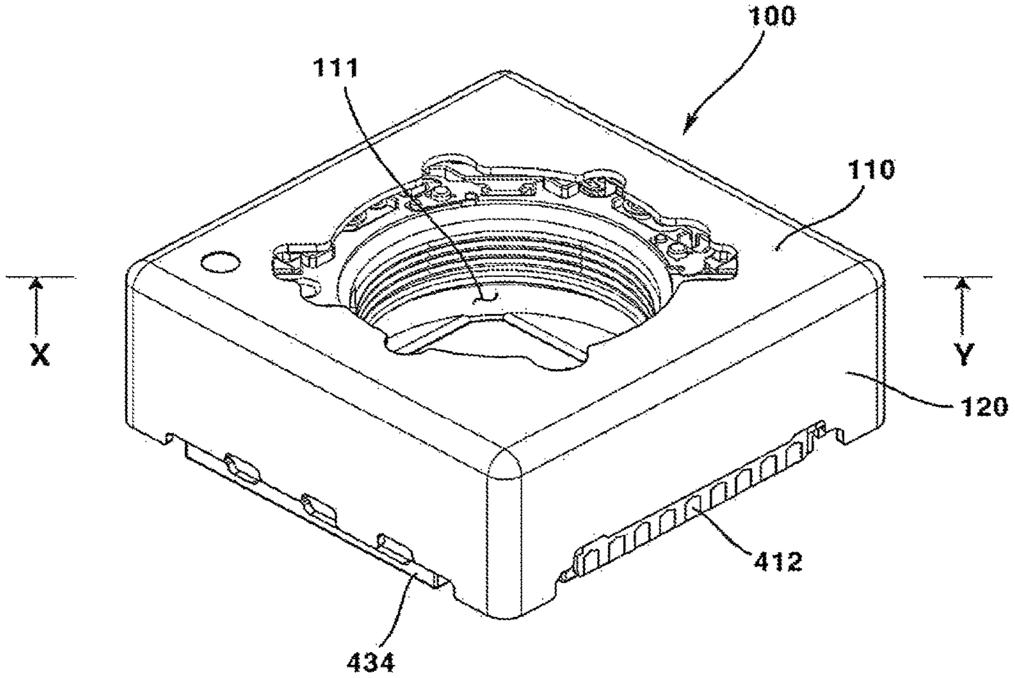
FIG. 10 is a perspective view of a lens driving device according to the present embodiment.
Figure 11:
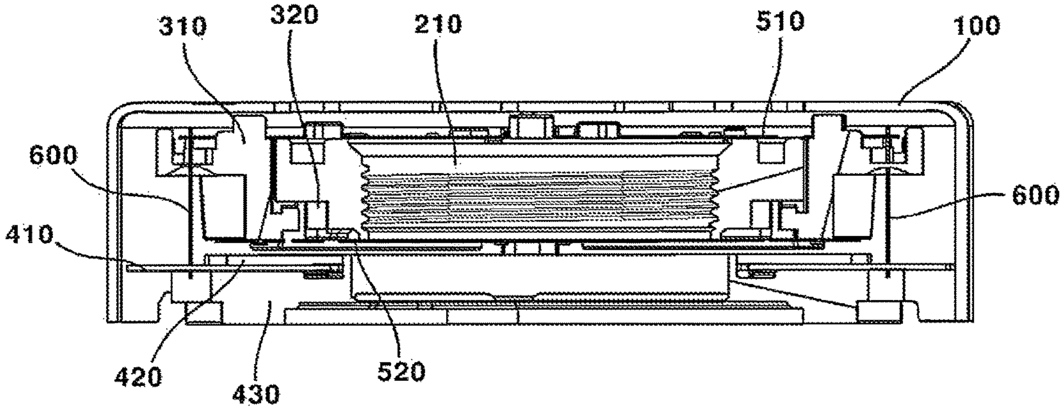
FIG. 11 is a cross-sectional view as viewed from X-Y of FIG. 10.
Figure 12:
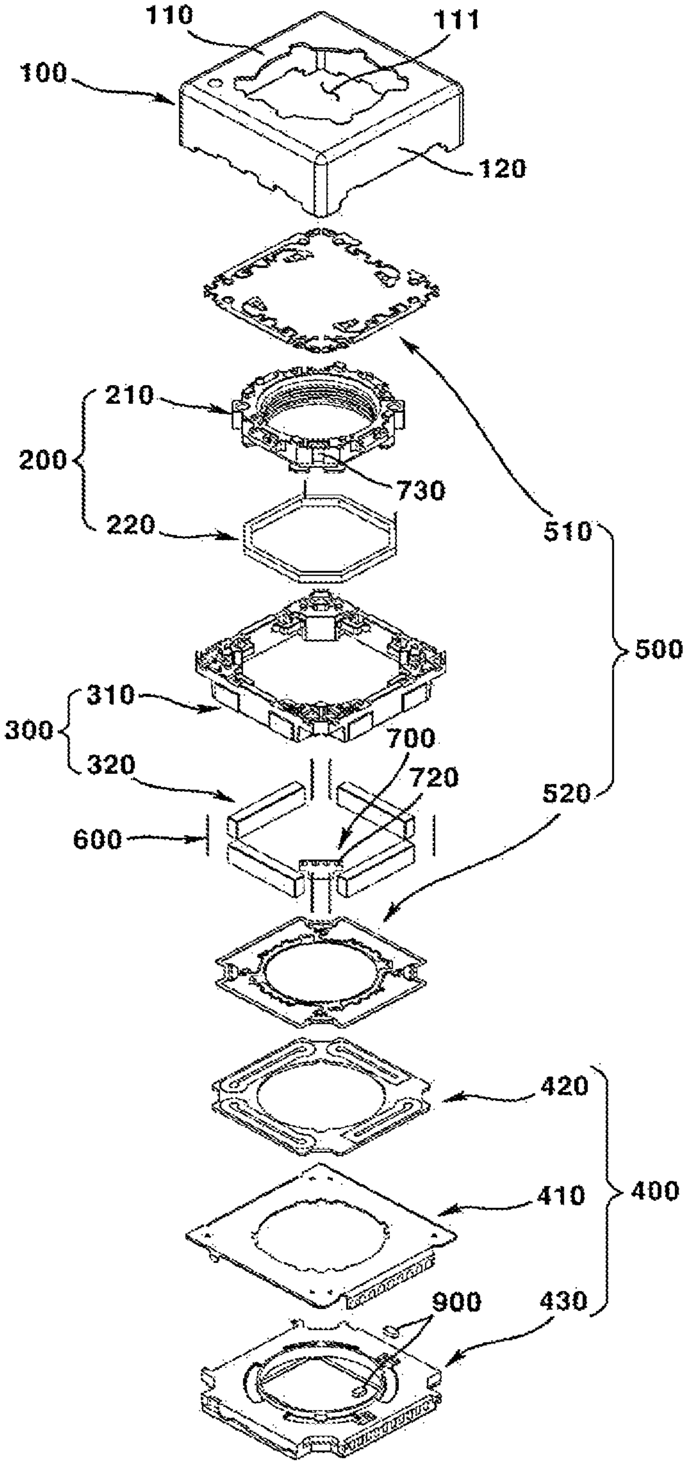
FIG. 12 is an exploded perspective view of a lens driving device according to the present embodiment.
Figure 13:
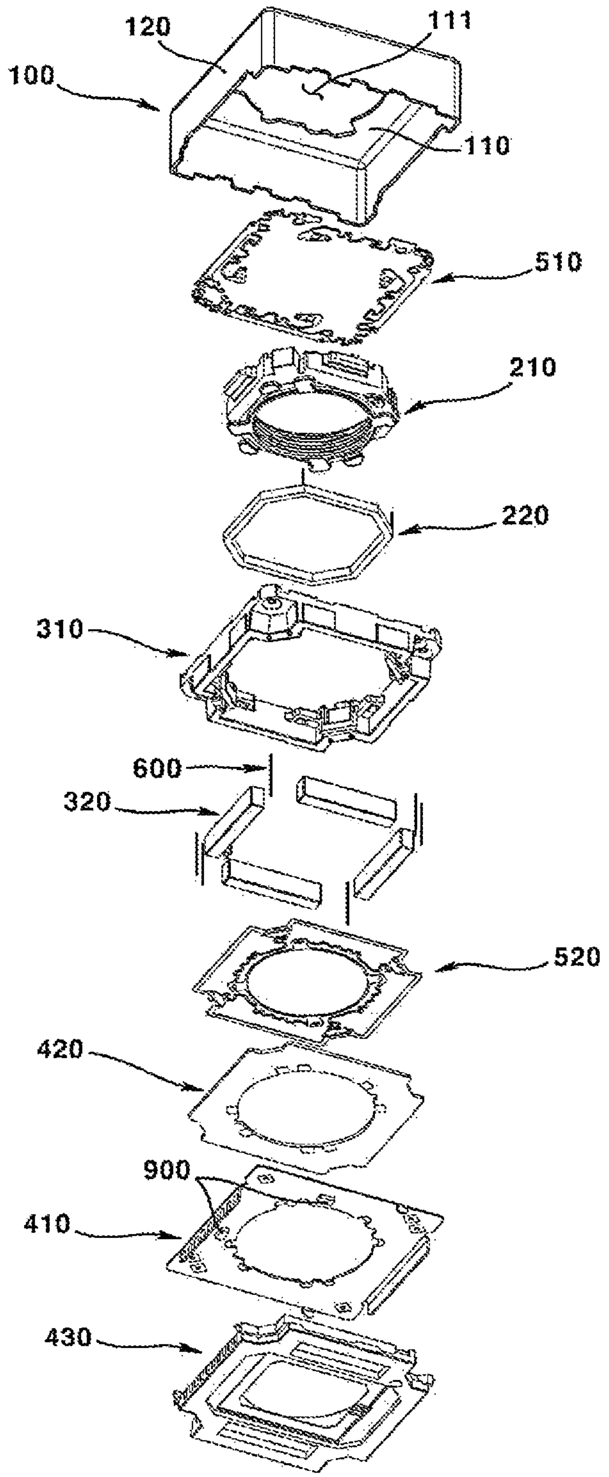
FIG. 13 is an exploded perspective view of the lens driving device according to the present embodiment as viewed from a different direction from FIG. 12.
Figure 14:
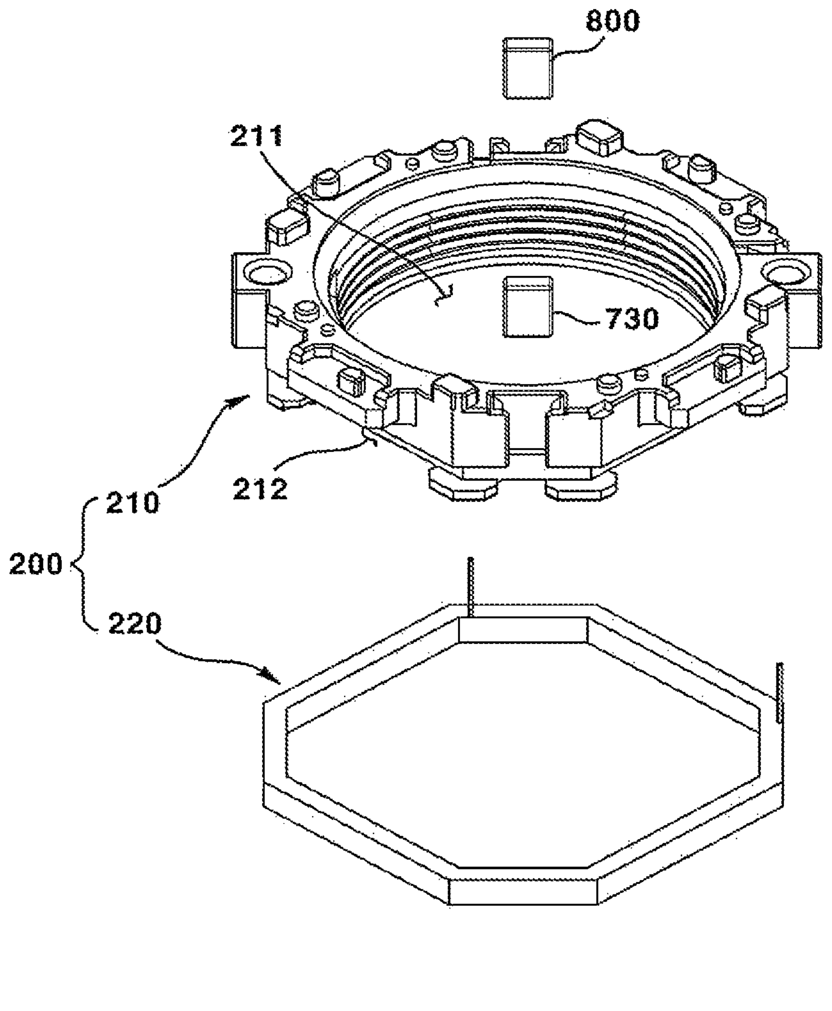
FIG. 14 is an exploded perspective view showing a first mover and related configurations according to the present embodiment.
Figure 15:
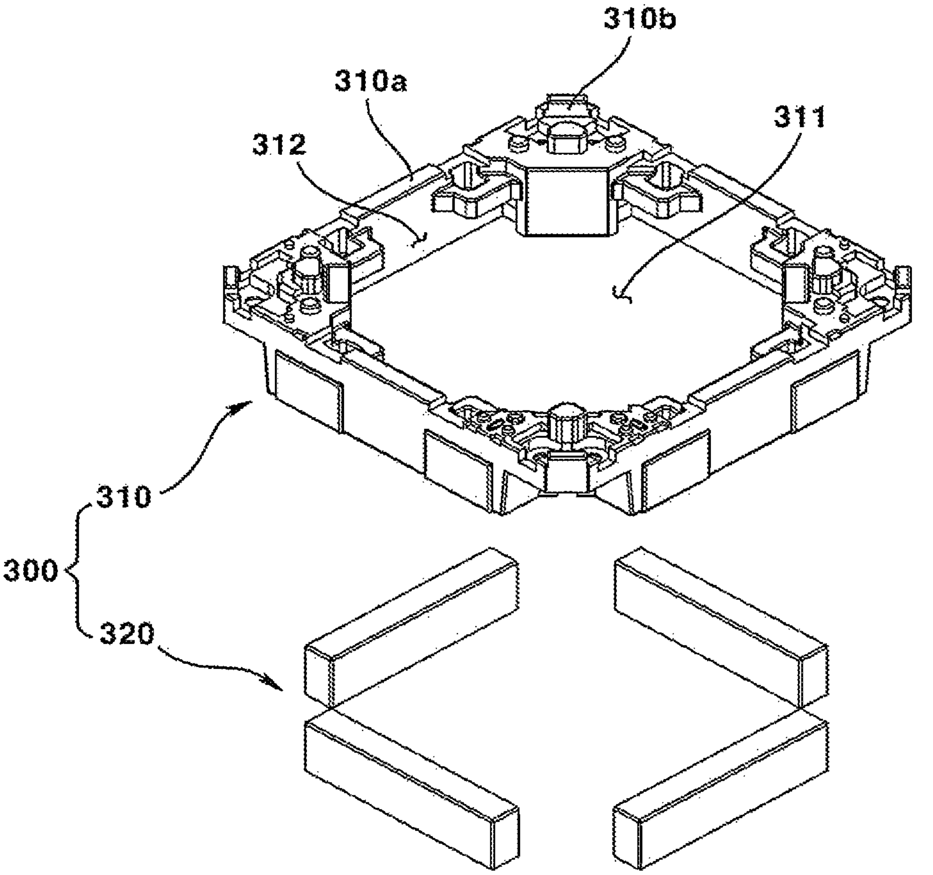
FIG. 15 is an exploded perspective view showing a second mover according to the present embodiment.
Figure 16:
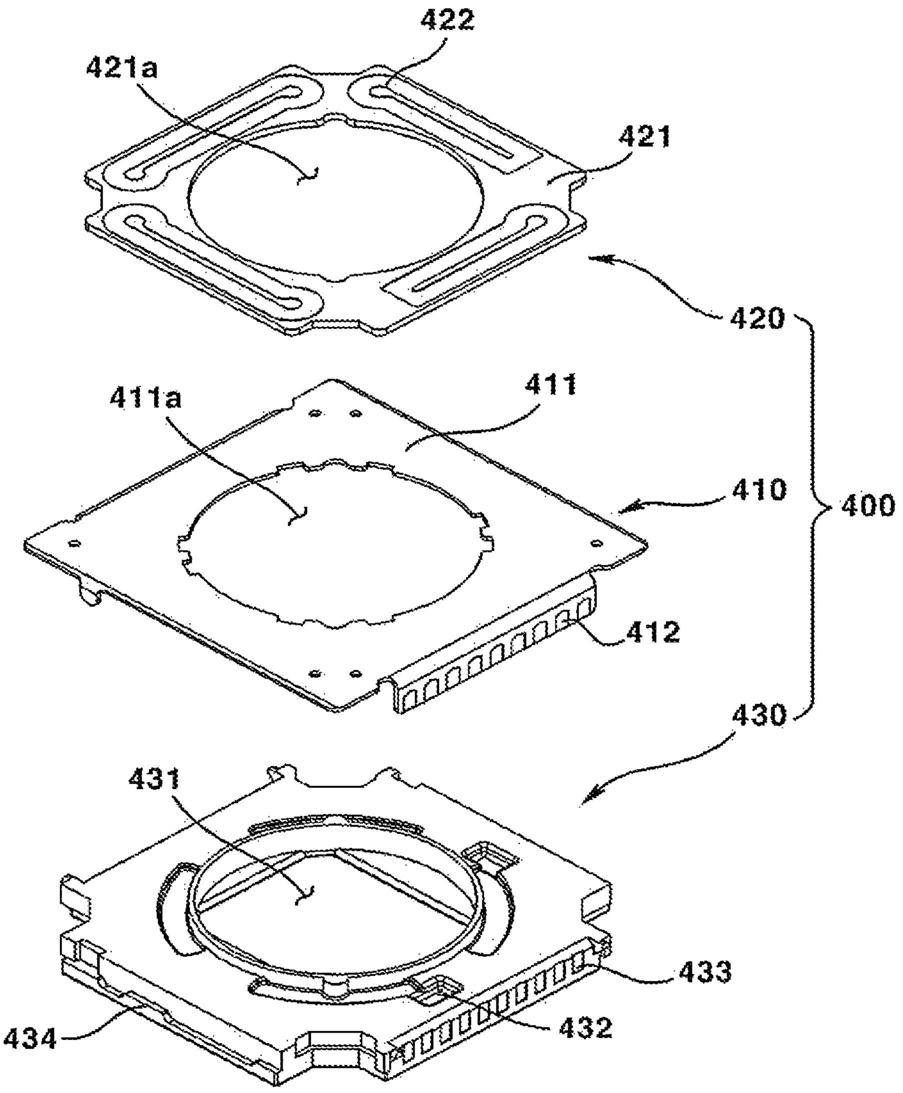
FIG. 16 is an exploded perspective view showing a stator according to the present embodiment.
Figure 17:
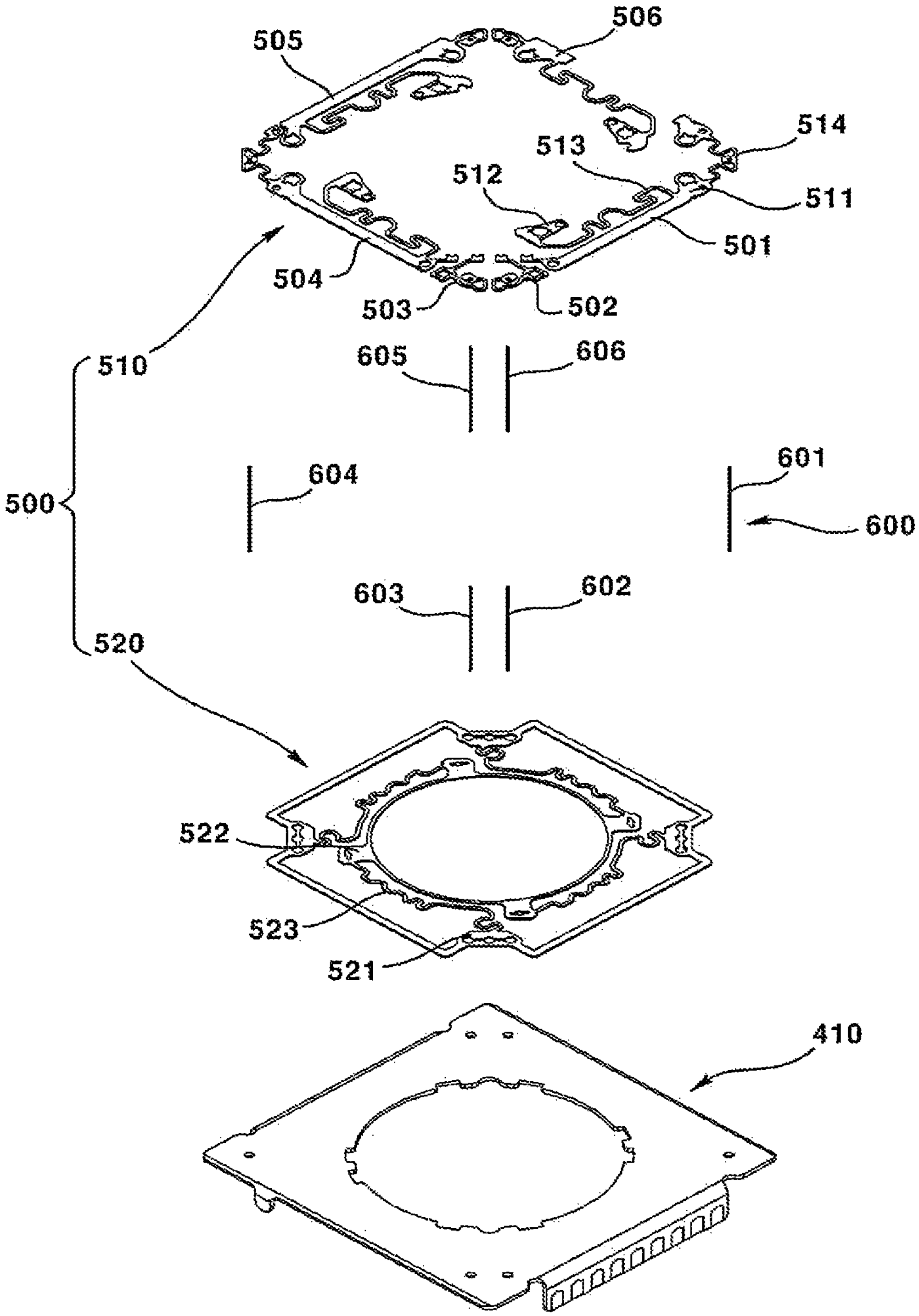
FIG. 17 is an exploded perspective view showing an elastic member, a support member, and related configurations according to the present embodiment.
Figure 18:
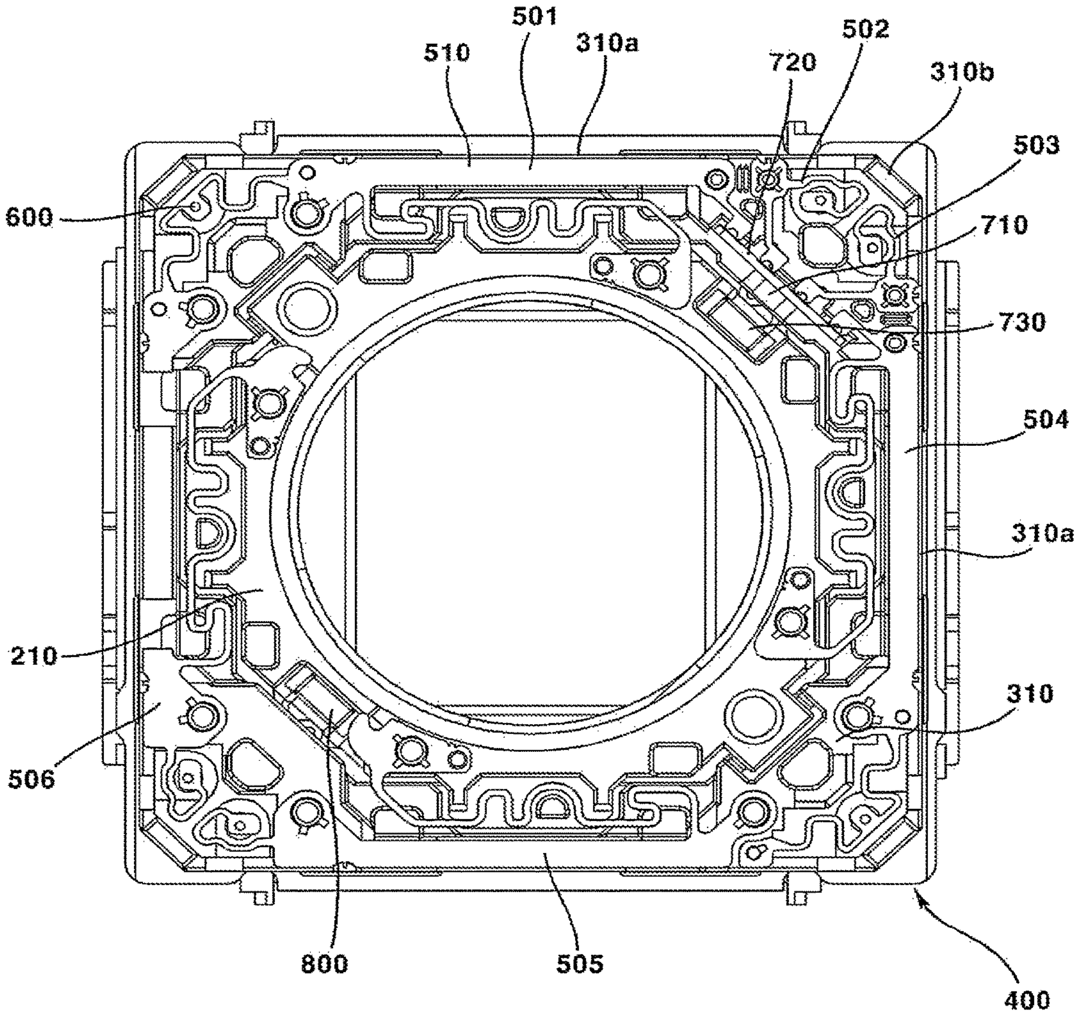
FIG. 18 is a plan view illustrating a lens driving device according to the present embodiment with a cover omitted.

FIG. 10 is a perspective view of a lens driving device according to the present embodiment; FIG. 11 is a cross-sectional view as viewed from X-Y of FIG. 10; FIG. 12 is an exploded perspective view of a lens driving device according to the present embodiment; FIG. 13 is an exploded perspective view of a lens driving device according to the present embodiment viewed from a different direction than FIG. 12; FIG. 14 is an exploded perspective view showing a first mover and related configuration according to the present embodiment; FIG. 15 is an exploded perspective view showing a second mover according to the present embodiment; FIG. 16 is an exploded perspective view showing a stator according to the present embodiment; FIG. 17 is an exploded perspective view showing an elastic member, a support member, and related configurations according to the present embodiment; FIG. 18 is a plan view illustrating a lens driving device according to the present embodiment with a cover omitted.

The lens driving device may be a voice coil motor (VCM). The lens driving device may be a lens driving motor. The lens driving device may be a lens driving actuator. The lens driving device may comprise an AF module. The lens driving device may comprise an OIS module. In the present embodiment, a case in which the lens driving device is an OIS module capable of both AF driving and OIS driving is described through the drawings, but in a modified embodiment, the lens driving device may be replaced with an AF module capable of only AF driving.

In another modified embodiment, the lens driving device may be of a fixed focus (FF) type that is fixed so that the lens does not move in the optical axis direction.

The lens driving device may comprise a cover 100. The cover 100 may comprise a ‘cover can’. The cover 100 may be disposed outside the housing 310. The cover 100 may be coupled to the base 430. The cover 100 may accommodate the housing 310 therein. The cover 100 may form the outer appearance of the lens driving device. The cover 100 may have a hexahedral shape with an open lower surface. The cover 100 may be a non-magnetic material. The cover 100 may be formed of a metal material. The cover 100 may be formed of a metal plate. The cover 100 may be connected to the ground portion of the first substrate 20. Through this, the cover 100 may be grounded. The cover 100 may block electromagnetic interference (EMI). At this time, the cover 100 may be referred to as ‘EMI shield can’.

The cover 100 may comprise an upper plate 110 and a side plate 120. The cover 100 may comprise an upper plate 110 comprising a hole 111 and a side plate 120 being extended downward from an outer circumference or edge of the upper plate 110. The lower end of the side plate 120 of the cover 100 may be disposed on a step portion 434 of the base 430. The inner surface of the side plate 120 of the cover 100 may be fixed to the base 430 by an adhesive.

The upper plate 110 of the cover 100 may comprise a hole 111. The hole 111 may comprise an ‘opening’. The hole 111 may be formed in the upper plate 110 of the cover 100. When viewed from above, the lens can be seen through the hole 111. The hole 111 may be formed in a size and shape corresponding to the lens. The size of the hole 111 may be larger than the diameter of the lens module so that the lens module can be inserted and assembled through the hole 111. The light introduced through the hole 111 may pass through the lens. At this time, the light that has passed through the lens may be converted into an electrical signal by the image sensor 10 and obtained as an image.

The lens driving device may comprise movers 200 and 300. The movers 200 and 300 may be parts being moved when a current is applied to the lens driving device. The movers 200 and 300 may comprise a first mover 200 and a second mover 300.

The lens driving device may comprise a first mover 200. The first mover 200 may be coupled with a lens. The first mover 200 may be coupled to the second mover 300 through an elastic member 500. The first mover 200 may move through an interaction with the second mover 300. At this time, the first mover 200 can move integrally with the lens. Meanwhile, the first mover 200 may move during AF driving. At this time, the first mover 200 may be referred to as an ‘AF mover’. However, the first mover 200 may be moved together with the second mover 300 even during OIS driving.

The first mover 200 may comprise a bobbin 210. The bobbin 210 may be disposed inside the housing 310. The bobbin 210 may be disposed in a hole 311 of the housing 310. The bobbin 210 may be movably coupled to the housing 310. The bobbin 210 may move in the optical axis direction with respect to the housing 310. A lens may be coupled to the bobbin 210. The bobbin 210 and the lens may be coupled by screw-coupling and/or an adhesive. A third coil 220 may be coupled to the bobbin 210. A first elastic member 510 may be coupled to an upper surface of the bobbin 210. A second elastic member 520 may be coupled to a lower surface of the bobbin 210. The bobbin 210 may be coupled to the elastic member 500 by heat fusion and/or an adhesive. The adhesive bonding the bobbin 210 and the lens, and the bobbin 210 and the elastic member 500 may be an epoxy cured by at least one of ultraviolet (UV), heat, and laser.

The bobbin 210 may comprise a hole 211. The hole 211 may penetrate the bobbin 210 in the optical axis direction. A lens module may be accommodated in the hole 211. For example, a thread corresponding to a thread formed on the outer circumferential surface of the lens module may be disposed on the inner circumferential surface of the bobbin 210 forming the hole 211.

The bobbin 210 may comprise a driving part coupling part 212. A third coil 220 may be coupled to the driving part coupling part 212. The driving part coupling part 212 may be formed on the outer circumferential surface of the bobbin 210. The driving part coupling part 212 may comprise a groove formed by recessing a portion of an outer side surface of the bobbin 210. The third coil 220 may be accommodated in the groove of the driving part coupling part 212. The driving part coupling part 212 may comprise a protrusion supporting the lower surface of the third coil 220.

The first mover 200 may comprise a third coil 220. The third coil 220 may be an ‘AF driving coil’ used for AF driving. The third coil 220 may be disposed on the bobbin 210. The third coil 220 may be disposed between the bobbin 210 and the housing 310. The third coil 220 may be disposed on an outer side surface or an outer circumferential surface of the bobbin 210. The third coil 220 may be directly wound on the bobbin 210. Or, the third coil 220 may be coupled to the bobbin 210 while being directly wound. The third coil 220 may face the first magnet 320. The third coil 220 may be disposed to face the first magnet 320. The third coil 220 may electromagnetically interact with the first magnet 320. In this case, when a current is supplied to the third coil 220 and an electromagnetic field is formed around the third coil 220, the third coil 220 may move with respect to the first magnet 320 by the electromagnetic interaction between the third coil 220 and the first magnet 320. The third coil 220 may be formed as a single coil. Or, the third coil 220 may comprise a plurality of coils spaced apart from each other.

The third coil 220 may comprise a pair of lead wires for supplying power. At this time, one end (lead wire) of the third coil 220 is coupled with a 1-5 elastic member 505, and the other end (lead wire) of the third coil 220 may be coupled with a 1-6 elastic member 506. That is, the third coil 220 may be electrically connected to the first elastic member 510. In more detail, the third coil 220 may sequentially receive power through the first substrate 20, the substrate 410, a support member 600, and the first elastic member 510. As a modified embodiment, the third coil 220 may be electrically connected to the second elastic member 520.

The lens driving device may comprise a second mover 300. The second mover 300 may be movably coupled to the stator 400 through the support member 600. The second mover 300 may support the first mover 200 through the elastic member 500. The second mover 300 may move the first mover 200 or may move together with the first mover 200. The second mover 300 may move through interaction with the stator 400. The second mover 300 may move during OIS driving. At this time, the second mover 300 may be referred to as an ‘OIS mover’. The second mover 300 can move integrally with the first mover 200 during OIS driving.

The second mover 300 may comprise a housing 310. The housing 310 may be disposed outside the bobbin 210. The housing 310 may accommodate at least a portion of the bobbin 210. The housing 310 may be disposed inside the cover 100. The housing 310 may be disposed between the cover 100 and the bobbin 210. The housing 310 may be formed of a material different from that of the cover 100. The housing 310 may be formed of an insulating material. The housing 310 may be formed of an injection product. The outer side surface of the housing 310 may be spaced apart from the inner surface of the side plate 120 of the cover 100. The housing 310 may move for OIS driving through the spaced space between the housing 310 and the cover 100. A first magnet 320 may be disposed in the housing 310. The housing 310 and the first magnet 320 may be coupled by an adhesive. The first elastic member 510 may be coupled to the upper surface of the housing 310. A second elastic member 520 may be coupled to the lower surface of the housing 310. The housing 310 may be coupled to the elastic member 500 by heat fusion and/or an adhesive. An adhesive for coupling of the housing 310 and the first magnet 320, and the housing 310 and the elastic member 500 may be an epoxy cured by at least one of ultraviolet (UV), heat, and laser.

The housing 310 may comprise four side portions 310*a* and four corner portions 310*b* disposed between the four side portions 310*a*. The side portion 310*a* of the housing 310 may comprise a first side portion, a second side portion disposed in the opposite side of the first side portion, and a third side portion and a fourth side portion disposed opposite each other between the first side portion and the second side portion. The corner portion 310*b* of the housing 310 may comprise a first corner portion disposed between the first side portion and third side portion, a second corner portion disposed between the first side portion and fourth side portion, a third corner portion disposed between the second side portion and the third side portion, and a fourth corner portion disposed between the second side portion and the fourth side portion. The side portion 310*a* of the housing 310 may comprise a 'side wall'.

The housing 310 may comprise a hole 311. The hole 311 may be formed in the housing 310. The hole 311 may be formed to penetrate the housing 310 in the optical axis direction. A bobbin 210 may be disposed in the hole 311. The hole 311 may be formed in a shape corresponding to the bobbin 210 at least in portion. An inner circumferential surface or an inner side surface of the housing 310 forming the hole 311 may be positioned to be spaced apart from the outer circumferential surface of the bobbin 210. However, the housing 310 and the bobbin 210 are overlapped with each other at least in portion in the optical axis direction to limit the moving stroke distance of the bobbin 210 in the optical axis direction.

The housing 310 may comprise a driving part coupling part 312. The first magnet 320 may be coupled to the driving part coupling part 312. The driving part coupling part 312 may comprise a groove formed by recessing a portion of the inner circumferential surface and/or the lower surface of the housing 310. The driving part coupling part 312 may be formed on each of the four side portions 310*a* of the housing 310. As a modified embodiment, the driving part coupling part 312 may be formed in each of the four corner parts 310*b* of the housing 310.

The second mover 300 may comprise a first magnet 320. The first magnet 320 may be disposed in the housing 310. The first magnet 320 may be fixed to the housing 310 by an adhesive. The first magnet 320 may be disposed between the bobbin 210 and the housing 310. The first magnet 320 may face the third coil 220. The first magnet 320 may electromagnetically interact with the third coil 220. The first magnet 320 may face the first coil 422. The first magnet 320 may electromagnetically interact with the first coil 422. The first magnet 320 may be commonly used for AF driving and OIS driving. The first magnet 320 may be disposed on the side portion 310*a* of the housing 310. At this time, the first magnet 320 may be a flat magnet having a flat plate shape. As a modified embodiment, the first magnet 320 may be disposed at a corner of the housing 310. At this time, the first magnet 320 may be a corner magnet having a hexahedral shape whose inner side surface is wider than the outer side surface.

The lens driving device may comprise a stator 400. The stator 400 may be disposed on one side of the movers 200 and 300. The stator 400 may be disposed under the movers 200 and 300. The stator 400 may movably support the second mover 300. The stator 400 may move the second mover 300. At this time, the first mover 200 may also move together with the second mover 300.

The stator 400 may comprise a substrate 410. The substrate 410 may comprise a circuit member 420. However, the substrate 410 may be described as a separate member as the circuit member 420. The substrate 410 may comprise a first coil 422 facing the first magnet 320. The substrate 410 may be disposed on the base 430. The substrate 410 may be disposed between the housing 310 and the base 430. The support member 600 may be coupled to the substrate 410. The substrate 410 may supply power to the first coil 422. The substrate 410 may be coupled to the circuit member 420. The substrate 410 may be coupled to the first coil 422. The substrate 410 may be coupled to the first substrate 20 disposed under the base 430. The substrate 410 may comprise a flexible printed circuit board (FPCB). The substrate 410 may be partially bent.

The substrate 410 may comprise a body portion 411. The substrate 410 may comprise a hole 411*a* formed in the body portion 411. The substrate 410 may comprise a hole 411*a* corresponding to a lens being coupled to the bobbin 210.

The substrate 410 may comprise a terminal portion 412. The terminal portion 412 may be extended downward from the body portion 411 of the substrate 410. The terminal portion 412 may be formed by bending a portion of the substrate 410. At least a portion of the terminal portion 412 may be exposed toward the outside. The terminal portion 412 may be coupled to the first substrate 20 disposed under the base 430 by soldering. The terminal portion 412 may be disposed on a terminal accommodating portion 433 of the base 430. The terminal portion 412 may comprise a plurality of terminals.

The stator 400 may comprise a circuit member 420. The circuit member 420 may be disposed on the base 430. The circuit member 420 may be disposed on the substrate 410. The circuit member 420 may be disposed between the first magnet 320 and the base 430. Here, although the circuit member 420 is described as a configuration separate from the substrate 410, the circuit member 420 may be understood as a configuration comprised in the substrate 410.

The circuit member 420 may comprise a substrate portion 421. The substrate portion 421 may comprise a 'substrate'. The substrate portion 421 may be an FPCB. The first coil 422 may be integrally formed on the substrate 421 as a fine pattern coil (FP coil). A hole through which the support member 600 passes may be formed in the substrate portion 421. The substrate portion 421 may comprise a hole 421*a*. The hole 421*a* of the substrate portion 421 may be disposed to correspond to the hole 411*a* of the substrate 410.

The circuit member 420 may comprise a first coil 422. The first coil 422 may face the first magnet 320. The first coil 422 may face the first magnet 320. The first coil 422 may electromagnetically interact with the first magnet 320. In this case, when a current is supplied to the first coil 422 and a magnetic field is formed around the first coil 422, the first magnet 320 may move with respect to the first coil 422 by the electromagnetic interaction between the first coil 422 and the first magnet 320. The first coil 422 may move the housing 310 and the bobbin 210 in a direction perpendicular to the optical axis with respect to the base 430 through electromagnetic interaction with the first magnet 320. The first coil 422 may be a fine pattern coil (FP coil) being formed integrally on the substrate portion 421.

The stator 400 may comprise a base 430. The base 430 may be disposed under the housing 310. The base 430 may be disposed under the substrate 410. The substrate 410 may be disposed on the upper surface of the base 430. The base 430 may be coupled to the cover 100. The base 430 may be disposed on the first substrate 20.

The base 430 may comprise a hole 431. The hole 431 may be formed in the base 430. The hole 431 may be formed to penetrate the base 430 in the optical axis direction. A light passing through the lens module through the hole 431 may be incident on the image sensor 10. That is, the light passing through the lens module may pass through the hole 421*a* of the circuit member 420, the hole 411*a* of the substrate 410, and the hole 431 of the base 430 to be incident on the image sensor 10.

The base 430 may comprise a sensor coupling part 432. A second sensor 900 may be disposed on the sensor coupling part 432. The sensor coupling part 432 may accommodate at least a portion of the second sensor 900. The sensor coupling part 432 may comprise a groove formed by recessing the upper surface of the base 430. The sensor coupling part 432 may comprise two grooves. At this time, a second sensor 900 is disposed in each of the two grooves to detect the movement of the first magnet 320 in the X-axis direction and the Y-axis direction.

The base 430 may comprise a terminal accommodating portion 433. The terminal portion 412 of the substrate 410 may be disposed in the terminal accommodating portion 433. The terminal accommodating portion 433 may comprise a groove formed by recessing a portion of a side surface of the base 430. The width of the terminal accommodating portion 433 may be formed to correspond to the width of the terminal portion 412 of the substrate 410. The length of the terminal accommodating portion 433 may be formed to correspond to the length of the terminal portion 412 of the substrate 410. Or, since the length of the terminal portion 412 of the substrate 410 is longer than the length of the terminal accommodating portion 433, a portion of the terminal portion 412 may be protruded under the base 430.

The base 430 may comprise a step portion 434. The step portion 434 may be formed on the side surface of the base 430. The step portion 434 may be formed around the outer circumferential surface of the base 430. The step portion 434 may be formed as a portion of the side surface of the base 430 is protruded or recessed. The lower end of the side plate 120 of the cover 100 may be disposed in the step portion 434.

The lens driving device may comprise an elastic member 500. The elastic member 500 may connect the housing 310 and the bobbin 210. The elastic member 500 may be coupled to the bobbin 210 and the housing 310. The elastic member 500 may elastically support the bobbin 210. The elastic member 500 may have elasticity at least in portion. The elastic member 500 may movably support the bobbin 210. The elastic member 500 may support movement of the bobbin 210 during AF driving. At this time, the elastic member 500 may be referred to as an 'AF support member'.

The elastic member 500 may comprise a first elastic member 510. The first elastic member 510 may be coupled to an upper portion of the bobbin 210 and an upper portion of the housing 310. The first elastic member 510 may be coupled to the upper surface of the bobbin 210. The first elastic member 510 may be coupled to the upper surface of the housing 310. The first elastic member 510 may be coupled to the support member 600. The first elastic member 510 may be formed of a plate spring.

The first elastic member 510 may comprise 1-1 to 1-6 elastic members 501, 502, 503, 504, 505, and 506 spaced apart from each other. The first elastic member 510 may be used as a conductive line for supplying electricity to a first sensor 710. The first elastic member 510 may comprise 1-1 to 1-4 elastic members 501, 502, 503, and 504 spaced apart from each other. Each of the 1-1 to 1-4 elastic members 501, 502, 503, and 504 may be coupled to the substrate 720 to which the first sensor 710 is coupled. The first elastic member 510 and the substrate 720 may be coupled by soldering. The first elastic member 510 may be used as a conductive line for supplying electricity to the third coil 220. The first elastic member 510 may comprise a 1-5 elastic member 505 and a 1-6 elastic member 506 spaced apart from each other. The 1-5 elastic member 505 may be coupled to one end of the third coil 220, and a 1-6 elastic member 506 may be coupled to the other end of the third coil 220. The first elastic member 510 and the third coil 220 may be coupled by soldering.

The first elastic member 510 may comprise an outer side portion 511. The outer side portion 511 may be coupled to the housing 310. The outer side portion 511 may be coupled to an upper surface of the housing 310. The outer side portion 511 may comprise a hole or groove coupled to the protrusion of the housing 310. The outer side portion 511 may be fixed to the housing 310 by an adhesive.

The first elastic member 510 may comprise an inner side portion 512. The inner side portion 512 may be coupled to the bobbin 210. The inner side portion 512 may be coupled to an upper surface of the bobbin 210. The inner side portion 512 may comprise a hole or groove coupled to the protrusion of the bobbin 210. The inner side portion 512 may be fixed to the bobbin 210 by an adhesive.

The first elastic member 510 may comprise a connection part 513. The connection part 513 may connect the outer side portion 511 and the inner side portion 512. The connection part 513 may have elasticity. At this time, the connection part 513 may be referred to as an 'elastic part'. The connection part 513 may be formed by being bent two or more times.

The first elastic member 510 may comprise a coupling part 514. The coupling part 514 may be coupled to the support member 600. The coupling part 514 may be coupled to the support member 600 by soldering. The coupling part 514 may comprise a hole or groove coupled to the support member 600. The coupling part 514 may be extended from the outer side portion 511. The coupling part 514 may comprise a bent portion formed by being bent.

The elastic member 500 may comprise a second elastic member 520. The second elastic member 520 may be disposed under the bobbin 210. The second elastic member 520 may be coupled to the bobbin 210 and the housing 310. The second elastic member 520 may be coupled to a lower surface of the bobbin 210. The second elastic member 520 may be coupled to a lower surface of the housing 310. The second elastic member 520 may be formed of a plate spring. The second elastic member 520 may be integrally formed.

The second elastic member 520 may comprise an outer side portion 521. The outer side portion 521 may be coupled to the housing 310. The outer portion 521 may be coupled to the lower surface of the housing 310. The outer side portion 521 may comprise a hole or groove coupled to the protrusion of the housing 310. The outer side portion 521 may be fixed to the housing 310 by an adhesive.

The second elastic member 520 may comprise an inner side portion 522. The inner side portion 522 may be coupled to the bobbin 210. The inner side portion 522 may be coupled to the lower surface of the bobbin 210. The inner side portion 522 may comprise a hole or groove coupled to the protrusion of the bobbin 210. The inner side portion 522 may be fixed to the bobbin 210 by an adhesive.

The second elastic member 520 may comprise a connection part 523. The connection part 523 may connect the outer side portion 521 and the inner side portion 522. The connection part 523 may elastically connect the outer side portion 521 and the inner side portion 522. The connection part 523 may have elasticity. At this time, the connection part 523 may be referred to as an 'elastic part'. The connection part 523 may be formed by being bent two or more times.

The lens driving device may comprise a support member 600. The support member 600 may connect the movers 200 and 300 and the stator 400. The support member 600 may be coupled to the first elastic member 510 and the substrate 410. The support member 600 may be coupled to the first elastic member 510 and the circuit member 420 of the substrate 410. The support member 600 may movably support the housing 310. The support member 600 may elastically support the housing 310. The support member 600 may have elasticity at least in portion. The support member 600 may support movement of the housing 310 and the bobbin 210 during OIS driving. At this time, the support member 600 may be referred to as an 'OIS support member'. The support member 600 may comprise an elastic member. The support member 600 may be formed of a wire. As a modified embodiment, the support member 600 may be formed of a plate spring.

The support member 600 may comprise a plurality of wires. The support member 600 may comprise six wires spaced apart from each other. The support member 600 may comprise first to sixth support portions 601, 602, 603, 604, 605, and 606 spaced apart from each other. The first to sixth support portions 601, 602, 603, 604, 605, and 606 may be used as conductive lines inside the lens driving device. The first to sixth support portions 601, 602, 603, 604, 605, and 606 may be coupled to the substrate 410. The first support portion 601 may be coupled to the 1-1 elastic member 501. The second support portion 602 may be coupled to the 1-2 elastic member 502. The third support portion 603 may be coupled to the 1-3 elastic member 503. The fourth support portion 604 may be coupled to the 1-4 elastic member 504. The fifth support portion 605 may be coupled to the 1-5 elastic member 505. The sixth support portion 606 may be coupled to the 1-6 elastic member 506.

The lens driving device may comprise a damper (not shown). The damper may be disposed on the support member 600. The damper may be disposed on the support member 600 and the housing 310. The damper may be disposed on the elastic member 500. The damper may be disposed on the elastic member 500 and the bobbin and/or the elastic member 500 and the housing 310. The damper may be disposed on the elastic member 500 and/or the support member 600 to prevent a resonance phenomenon that is occurring in the elastic member 500 and/or the support member 600.

The lens driving device may comprise a first sensor unit 700. The first sensor unit 700 may be provided for auto focus feedback. The first sensor unit 700 may detect movement of the bobbin 210 in the optical axis direction. The first sensor unit 700 may detect a movement amount of the bobbin 210 in the optical axis direction and provide it to the controller in real time.

The lens driving device may comprise a first sensor 710. The first sensor 710 may be used for AF feedback driving. At this time, the first sensor 710 may be referred to as an 'AF feedback driving sensor'. The first sensor 710 may be disposed in the housing 310. In a modified embodiment, the first sensor 710 may be disposed on the bobbin 210. The first sensor 710 may detect the movement of the first mover 200. The first sensor 710 may comprise a Hall sensor. At this time, the Hall sensor may sense the magnetic force of the third magnet 730 to detect movement of the bobbin 210 and the lens. The detection value sensed by the first sensor 710 may be used for AF feedback control.

The lens driving device may comprise a substrate 720. The substrate 720 may be disposed in the housing 310. The substrate 720 may be coupled to the first sensor 710. The substrate 720 may be electrically connected to the first sensor 710. The substrate 720 may be coupled to the first elastic member 510. The substrate 720 may comprise four terminals coupled to the 1-1 to 1-4 elastic members 501, 502, 503, and 504. The substrate 720 and the first elastic member 510 may be coupled by soldering.

The lens driving device may comprise a third magnet 730. The third magnet 730 may be a 'sensing magnet'. The third magnet 730 may be disposed on the bobbin 210. The third magnet 730 may be detected by the first sensor 710. The third magnet 730 may face the first sensor 710. The third magnet 730 may be disposed at the corner of the bobbin 210. That is, the third magnet 730 may be disposed to face the corner portion **310*b* of the housing 310**.

The lens driving device may comprise a fourth magnet 800. The fourth magnet 800 may be a 'compensation magnet'. The fourth magnet 800 may be disposed on the bobbin 210. The fourth magnet 800 may be disposed to achieve magnetic force equilibrium with the third magnet 730. The fourth magnet 800 may be symmetrical with the third magnet 730 centered about the optical axis. The fourth magnet 800 may be disposed at a position corresponding to the third magnet 730 centered about the optical axis. The fourth magnet 800 may have a size and/or shape corresponding to the third magnet 730 centered about the optical axis. A third magnet 730 may be disposed on one side of the bobbin 210 and a fourth magnet 800 may be disposed on the other side of the bobbin 210. The fourth magnet 800 may be disposed at the corner of the bobbin 210. That is, the fourth magnet 800 may be disposed to face the corner portion **310*b* of the housing 310**.

The lens driving device may comprise a second sensor 900. The second sensor 900 may be used for IS feedback control. At this time, the second sensor 900 may be referred to as a "sensor for driving OIS feedback". The second sensor 900 may be disposed between the base 430 and the substrate 410. The second sensor 900 may detect the movement of the second mover 300. The second sensor 900 may comprise a Hall sensor. At this time, the Hall sensor may sense the magnetic force of the first magnet 320 to detect movement of the housing 310 and the first magnet 320. The detection value sensed by the second sensor 900 may be used for OIS feedback control.

Hereinafter, the operation of the camera device according to the present embodiment will be described.

The auto focus function of the camera device according to the present embodiment will be described. When a power is supplied to the third coil 220 the third coil 220 moves with respect to the first magnet 320 due to electromagnetic interaction between the third coil 220 and the first magnet 320. At this time, the bobbin 210 to which the third coil 220 is coupled moves integrally with the third coil 220. That is, the bobbin 210 to which the lens module is coupled moves in the optical axis direction with respect to the housing 310. Since this movement of the bobbin 210 results in a movement of the lens module to be closer or further away from the image sensors 10 and 1010, in this embodiment, power is supplied to the third coil 220 so that the focus adjustment can be performed on the subject. Meanwhile, the aforementioned focus adjustment may be automatically performed according to the distance of the subject.

In the camera device according to the present embodiment, auto focus feedback control may be performed for a more precise implementation of the auto focus function. The first sensor 710 disposed in the housing 310 senses the magnetic field of the third magnet 730 disposed in the bobbin 210. Therefore, when the bobbin 210 performs relative movement with respect to the housing 310 the amount of the magnetic field sensed by the first sensor 710 changes. In this way, the first sensor 710 detects the amount of movement of the bobbin 210 in the optical axis direction or the position of the bobbin 210 and transmits the detected value to the controller. The controller determines whether to perform additional movement of the bobbin 210 based on the received detection value. Since such a process occurs in real time, the auto focus function of the camera device according to the present embodiment can be performed more precisely through the auto focus feedback control.

An image stabilization function of the camera device according to the present embodiment will be described. When power is supplied to the first coil 422 the first magnet 320 moves with respect to the first coil 422 due to electromagnetic interaction between the first coil 422 and the first magnet 320. At this time, the housing 310 to which the first magnet 320 is coupled moves integrally with the first magnet 320. That is, the housing 310 moves in a horizontal direction (a direction perpendicular to the optical axis) with respect to the base 430. However, at this time, a tilt of the housing 310 may be induced with respect to the base 430. Meanwhile, the bobbin 210 moves integrally with the housing 310 with respect to the horizontal movement of the housing 310. Therefore, such movement of the housing 310 results in a lens module coupled to the bobbin 210 with respect to the image sensors 10 and 1010 to be moved in a direction parallel to the direction in which the image sensors 10 and 1010 are placed. That is, in the present embodiment, the image stabilization function can be performed by supplying power to the first coil 422.

In the camera device according to the present embodiment, image stabilization feedback control may be performed in order to more accurately realize the image stabilization function. The second sensor 900 disposed on the base 430 senses the magnetic field of the first magnet 320 disposed on the housing 310. Therefore, when the housing 310 moves with respect to the base 430 the amount of the magnetic field detected by the second sensor 900 is changed. A pair of second sensors 900 detects the movement amount or position of the housing 310 in the horizontal direction (x-axis and y-axis directions) in this way and transmits the detected value to the controller. The controller determines whether to perform additional movement of the housing 310 based on the received detection value. Since such a process occurs in real time, the image stabilization function of the camera device according to the present embodiment can be performed more precisely through image stabilization feedback control.

In the above description, all components constituting the embodiments of the present invention are described as being combined or operating in combination, but the present invention is not necessarily limited to the embodiments. In other words, within the scope of the purpose of this invention, all of those components may operate in selective combinations of one or more components. In addition, the term “comprise”, “comprise”, or “have” described above means that the corresponding components can be embedded unless there is an opposite description therefore it should be interpreted that other components may further be comprised in addition to those corresponding components. All terms, comprising technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary.

The above description is only to those described as the technical idea of the present invention by way of an example, and those skilled in the art will appreciate that various modifications and variations can be made without departing from the essential features of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being comprised in the scope of the present invention.

What is claimed is:

1. A camera device comprising:

a first substrate;

a second substrate disposed on the first substrate;

an image sensor disposed on the second substrate;

a third substrate connecting the first substrate and the second substrate; and a coil and a magnet configured to move the image sensor, wherein the image sensor comprises first and second lateral surfaces opposite to each other, and third and fourth lateral surfaces opposite to each other, wherein the coil comprises first to third coils, wherein, when viewed from above, the first coil is disposed on an outer side of the first lateral surface of the image sensor, the second coil is disposed on an outer side of the second lateral surface of the image sensor, and the third coil is disposed on an outer side of the third lateral surface of the image sensor, wherein at least a portion of the first coil is overlapped with the second coil in a direction perpendicular to the first lateral surface of the image sensor, wherein the second coil is closer to the fourth lateral surface of the image sensor than to the third lateral surface of the image sensor, wherein only the second coil is disposed on the outer side of the second lateral surface of the image sensor, and wherein, when viewed from above in an optical axis direction of the image sensor, the third coil is overlapped with an imaginary extension line of the first lateral surface of the image sensor.

2. The camera device of claim 1, wherein the magnet comprises first to third magnets, and wherein the image sensor is configured to move to perform an Optical Image Stabilization function by the interaction between the first coil and the first magnet, between the second coil and the second magnet, and between the third coil and the third magnet.

3. The camera device of claim 1, wherein the first coil is closer to the fourth lateral surface of the image sensor than to the third lateral surface of the image sensor.

4. The camera device of claim 1, wherein the third coil is closer to the first lateral surface of the image sensor than to the second lateral surface of the image sensor.

5. The camera device of claim 1, wherein the coil comprises a fourth coil, and wherein, when viewed from above, the fourth coil is disposed on an outer side of the fourth lateral surface of the image sensor.

6. The camera device of claim 1, wherein the third substrate is electrically connected with the image sensor and comprises a bent shape.

7. The camera device of claim 6, wherein the bent shape of the third substrate is formed by being bent twice or more.

8. The camera device of claim 1, wherein the second substrate is a rigid printed circuit board, and wherein the third substrate is a flexible printed circuit board.

9. The camera device of claim 1, wherein the second substrate and the third substrate are a rigid flexible printed circuit board formed integrally.

10. The camera device of claim 1, wherein a thickness of the second substrate is greater than a thickness of the third substrate.

11. The camera device of claim 1, wherein the third substrate is connected to an outer lateral surface of the second substrate.

12. The camera device of claim 1, wherein the coil is overlapped with the magnet in the optical axis direction.

13. The camera device of claim 1, wherein the third substrate is configured to movably support the second substrate with respect to the first substrate.

14. The camera device of claim 1, wherein the second substrate comprises a coupling part coupled to the image sensor, and an extension part extending outwardly from the coupling part, wherein at least a portion of the extension part of the second substrate is overlapped with the first substrate in the optical axis direction, and wherein a ball is disposed between the first substrate and the extension part of the second substrate.

15. The camera device of claim 14, wherein the first substrate comprises a groove formed on an upper surface of the first substrate, and wherein the ball is disposed on the groove of the first substrate.

16. The camera device of claim 14, wherein the second coil is overlapped with the ball in the optical axis direction.

17. An optical instrument comprising:

a main body;

the camera device of claim 1 disposed on the main body; and a display disposed on the main body and outputting an image photographed by the camera device.

18. A camera device comprising:

a second substrate;

an image sensor disposed on the second substrate;

a third substrate extending from the second substrate; and a coil and a magnet overlapped with each other in an optical axis direction of the image sensor, wherein the image sensor comprises first and second lateral surfaces opposite to each other, and third and fourth lateral surfaces opposite to each other, wherein the coil comprises first to third coils, wherein, when viewed from above, the first coil is disposed on an outer side of the first lateral surface of the image sensor, the second coil is disposed on an outer side of the second lateral surface of the image sensor, and the third coil is disposed on an outer side of the third lateral surface of the image sensor, wherein at least a portion of the first coil is overlapped with the second coil in a direction perpendicular to the first lateral surface of the image sensor, wherein the second coil is closer to the fourth lateral surface of the image sensor than to the third lateral surface of the image sensor, wherein only the second coil is disposed on the outer side of the second lateral surface of the image sensor, and wherein, when viewed from above in the optical axis direction, the third coil is overlapped with an imaginary extension line of the first lateral surface of the image sensor.

19. The camera device of claim 18, wherein each of the first and second lateral surfaces is shorter than each of the third and fourth lateral surfaces.

20. The camera device of claim 1, wherein each of the first and second lateral surfaces is shorter than each of the third and fourth lateral surfaces.

* * * * *